United States Patent
Takabayashi

(10) Patent No.: US 7,455,887 B2
(45) Date of Patent: *Nov. 25, 2008

(54) ACTINIC RAY CURABLE INK-JET INK COMPOSITION, IMAGE FORMATION METHOD EMPLOYING THE SAME, AND INK-JET RECORDING APPARATUS

(75) Inventor: Toshiyuki Takabayashi, Hachioji (JP)

(73) Assignee: Konica Minolta Medical & Graphic Inc., Tokyo (JP)

(*) Notice: Subject to any disclaimer, the term of this patent is extended or adjusted under 35 U.S.C. 154(b) by 378 days.

This patent is subject to a terminal disclaimer.

(21) Appl. No.: 10/979,274

(22) Filed: Nov. 3, 2004

(65) Prior Publication Data

US 2005/0113483 A1    May 26, 2005

(30) Foreign Application Priority Data

Nov. 6, 2003 (JP) ............... 2003-376391

(51) Int. Cl.
G03F 7/029 (2006.01)
B05D 1/32 (2006.01)
C08G 65/02 (2006.01)
B41M 5/00 (2006.01)
B41J 2/01 (2006.01)

(52) U.S. Cl. ............... 427/466; 522/7; 522/25; 522/168; 522/170; 522/31

(58) Field of Classification Search ............... 427/466; 522/7, 25, 31, 168, 170
See application file for complete search history.

(56) References Cited

U.S. PATENT DOCUMENTS

| | | | |
|---|---|---|---|
| 6,145,979 A | 11/2000 | Caiger et al. | |
| 6,368,769 B1* | 4/2002 | Ohkawa et al. | 430/270.1 |
| 6,846,074 B2* | 1/2005 | Hirai | 347/102 |
| 6,959,986 B2* | 11/2005 | Ushirogouchi et al. | 347/100 |
| 7,119,130 B2* | 10/2006 | Sasa | 522/170 |
| 7,244,473 B2* | 7/2007 | Takabayashi et al. | 427/466 |
| 2005/0043437 A1* | 2/2005 | Watanabe | 523/160 |
| 2005/0064333 A1* | 3/2005 | Crivello | 430/270.1 |
| 2005/0148679 A1* | 7/2005 | Chiu et al. | 522/6 |
| 2005/0287476 A1* | 12/2005 | Ishikawa et al. | 430/281.1 |

(Continued)

FOREIGN PATENT DOCUMENTS

JP            60-132767        7/1985

(Continued)

OTHER PUBLICATIONS

Translation of JP 2002-241474 provided by Applicant.*

(Continued)

*Primary Examiner*—Susan W Berman
(74) *Attorney, Agent, or Firm*—Finnegan, Henderson, Farabow, Garrett & Dunner LLP

(57) ABSTRACT

Disclosed is an actinic ray curable ink-jet ink composition containing a photopolymerizable compound, a sulfonium salt (compound A) as a photoinitiator, which does not release benzene on actinic ray exposure, and a compound (compound B) as a sensitizing agent selected from the group consisting of (i) a polycyclic aromatic compound having a hydroxyl group, a substituted or unsubstituted aralkyloxy group or a substituted or unsubstituted alkoxy group, (ii) a carbazole derivative, and (iii) a thioxanthone derivative.

20 Claims, 2 Drawing Sheets

U.S. PATENT DOCUMENTS

| | | | |
|---|---|---|---|
| 2006/0055088 A1* | 3/2006 | Nakayashiki et al. | 264/425 |
| 2007/0054974 A1* | 3/2007 | Miura et al. | 522/31 |
| 2007/0060663 A1* | 3/2007 | Masumi | 522/31 |
| 2007/0165072 A1* | 7/2007 | Watanabe | 347/52 |
| 2007/0247503 A1* | 10/2007 | Fukawa et al. | 347/100 |
| 2008/0012918 A1* | 1/2008 | Masumi et al. | 347/102 |
| 2008/0055379 A1* | 3/2008 | Ishikawa et al. | 347/102 |

FOREIGN PATENT DOCUMENTS

| | | | |
|---|---|---|---|
| JP | 06-009714 | | 1/1994 |
| JP | 06-200204 | | 7/1994 |
| JP | 10-147608 | | 6/1998 |
| JP | 2000-504778 | | 4/2000 |
| JP | 2000-239648 | | 9/2000 |
| JP | 2001-031892 | | 2/2001 |
| JP | 2001-040068 | | 2/2001 |
| JP | 2001-055507 | | 2/2001 |
| JP | 2001-220526 | | 8/2001 |
| JP | 2001-310937 | | 11/2001 |
| JP | 2001-310938 | | 11/2001 |
| JP | 2002-188025 | * | 7/2002 |
| JP | 2002-239309 | | 8/2002 |
| JP | 2002-241474 | * | 8/2002 |

OTHER PUBLICATIONS

Machine translation of JP 2002-188025 from PAJ website.*

* cited by examiner

ACTINIC RAY CURABLE INK-JET INK COMPOSITION, IMAGE FORMATION METHOD EMPLOYING THE SAME, AND INK-JET RECORDING APPARATUS

FIELD OF THE INVENTION

The present invention relates to an actinic ray curable ink-jet ink composition capable of stably forming an image with high precision on various recording sheets, under various recording circumstances, an image formation method employing the same, and an ink-jet recording apparatus.

BACKGROUND OF THE INVENTION

In recent years, an ink jet recording method has found wide application in various kinds of graphic art fields such as photography, various kinds of printing, marking and specific printing such as a color filter because of being able to form images easily and inexpensively. Particularly, it has also become possible to obtain image quality comparable to silver salt photograph images by utilizing a recording apparatus which ejects and controls fine dots, ink in which a color reproduction range, durability and ejection suitability have been improved, and exclusive paper in which ink absorption, color forming property of colorants and surface gloss have been greatly improved. Image quality improvement of an ink jet recording method of today has been achieved only when a complete set of a recording apparatus, ink and exclusive paper is prepared.

However, an ink jet system which requires exclusive paper is problematic in respect to limitation of a recording medium and cost up of a recording medium. Therefore, many attempts have been made which record on a recording medium different from exclusive paper, employing an ink jet recording. Concretely, there are methods such as a phase-conversion ink jet method utilizing wax which is solid at room temperature, a solvent-type ink jet method utilizing an ink which is mainly comprised of a rapid-drying organic solvent and a UV ink jet method in which an ink is cross-linked by ultraviolet (UV) light after recording.

Among them, a UV ink jet method has been noted recently in respect to odor relatively lower than that of a solvent-type ink jet method, rapid drying property and capability of recording on a recording medium having no ink absorption. UV-curable ink jet inks are disclosed, for example, in Japanese Patent O.P.I. Publication Nos. 6-200204 and 2000-504778.

However, even when these inks are employed, the dot diameter of ink ejected onto recording material changes significantly depending on the kinds of recording material or operating conditions, and it is therefore impossible to form a high resolution image on various recording materials.

In a UV-curable ink-jet ink, ink employing a cationically polymerizable compound (see for example, Japanese Patent O.P.I. Publication Nos. 2002-188025, 2000-239648, and 2002-239309, and Japanese Patent Publication No. 3437069) is not affected by oxygen, however, it has problem in that the polymerization reaction is susceptible to moisture in the molecular level (or humidity) on account of its polymerization mechanism.

A cationically polymerizable composition employing a photoinitiator generating benzene as a decomposition product on actinic ray exposure, which includes a triaryl sulfonium salt, UV16992 produced by DOW CHEMICAL CO., LTD., has been prepared (see for example, Japanese Patent O.P.I. Publication Nos. 2002-188025, 2002-239309, and 2002-239648, and Japanese Patent Publication No. 3437069). However, this composition is not applied to the field of foods on account of generation of benzene, and further has problem in that its ejection stability deteriorates depending on ambient atmosphere (such as temperature or humidity). Accordingly, it has been impossible to form an image with high precision according to an ink-jet recording method employing the composition as ink.

It is well known that at least one compound selected from a polycyclic aromatic compound having a hydroxyl group, a substituted or unsubstituted aralkyloxy group or a substituted or unsubstituted alkoxy group, a carbazole derivative and a thioxanthone derivative is used as a sensitizing agent (see for example, Japanese Patent Publication No. 3437069, and Japanese Patent O.P.I. Publication Nos. 2000-239648, and 2002-239309). However, they cannot provide stable ejection of ink-jet for ink-jet recording, and cannot practically be used.

SUMMARY OF THE INVENTION

The present invention has been made in view of the above. An object of the invention is to provide an actinic ray curable ink-jet ink composition, which stably forms an image with high precision, and a character with excellent quality, without color contamination under various recording circumstances, and an image formation method and an ink jet recording apparatus each employing the actinic ray curable ink-jet ink composition.

DETAILED DESCRIPTION OF THE INVENTION

Figure 1:
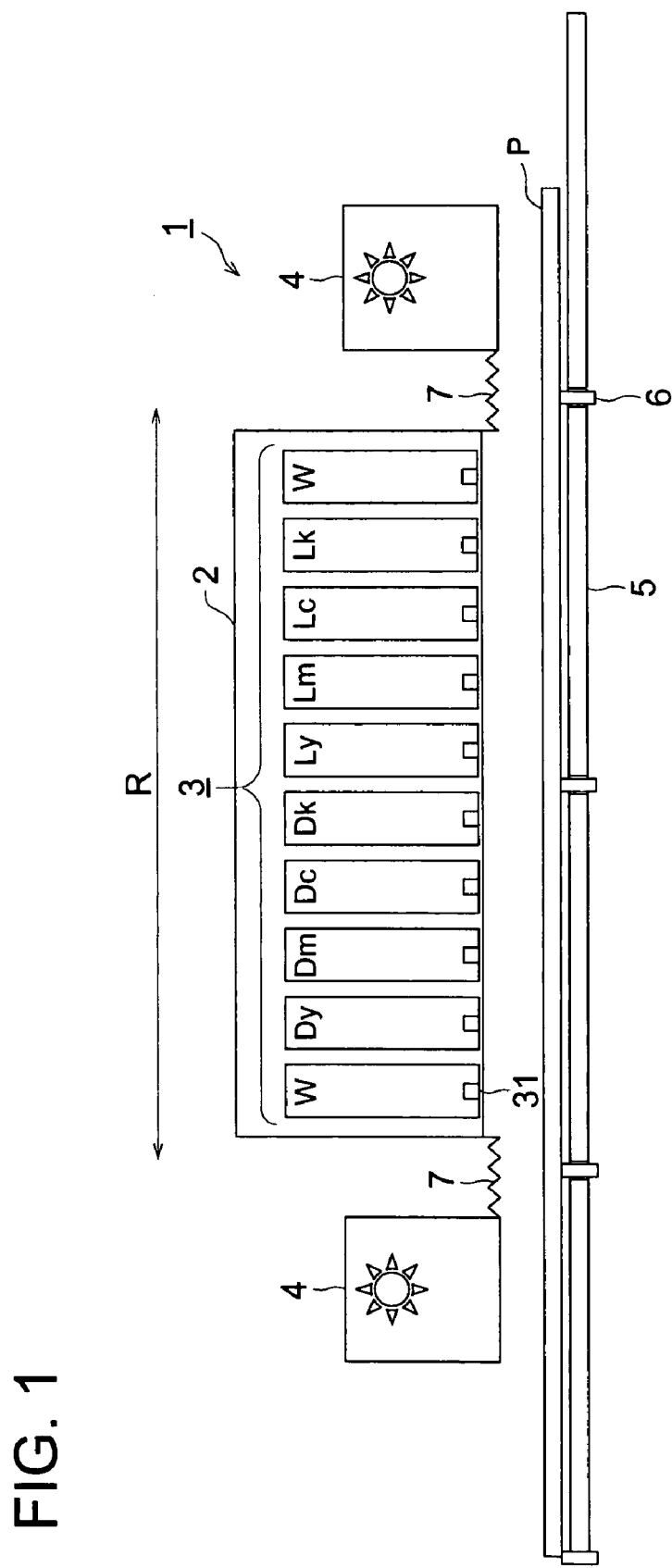
FIG. 1 shows a front view of one embodiment of the main section of the ink-jet recording apparatus of the invention.

The above object of the present invention can be achieved by the following:

1. An actinic ray curable ink-jet ink composition containing a photopolymerizable compound, a sulfonium salt (compound A) as a photoinitiator, which does not release benzene on actinic ray exposure, and a compound (compound B) as a sensitizing agent selected from the group consisting of (i) a polycyclic aromatic compound having a hydroxyl group, a substituted or unsubstituted aralkyloxy group or a substituted or unsubstituted alkoxy group, (ii) a carbazole derivative, and (iii) a thioxanthone derivative.

2. The actinic ray curable ink-jet ink composition of item 1 above, wherein the compound B is a carbazole derivative represented by the following formula (1) or (2):

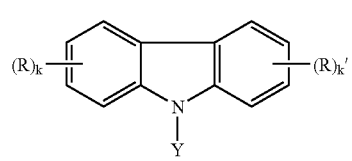

Formula (1)

wherein R represents a fluorine atom, a chlorine atom, a bromine atom, a hydroxyl group, a mercapto group, a nitro group or a monovalent organic group having a carbon atom number of from 1 to 19; k and k' independently represent an integer of from 0 to 4, provided that when k and k' are 2 or more, plural Rs may be the same or different; and Y represents a monovalent organic group having a carbon atom number of from 1 to 18.

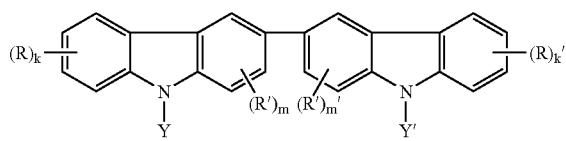

Formula (2)

wherein R and R' independently represent a fluorine atom, a chlorine atom, a bromine atom, a hydroxyl group, a mercapto group, a nitro group or a monovalent organic group having a carbon atom number of from 1 to 19; k and k' independently represent an integer of from 0 to 4; m and m' independently represent an integer of from 0 to 2, provided that when k and k' are 2 or more, plural Rs may be the same or different, and when m and m' are 2 or more, plural R's may be the same or different; and Y and Y' independently represent a monovalent organic group having a carbon atom number of from 1 to 18.

3. The actinic ray curable ink-jet ink composition of item 1 above, wherein the sulfonium salt (the compound A) is a sulfonium salt represented by the following formula (3), (4), (5), or (6):

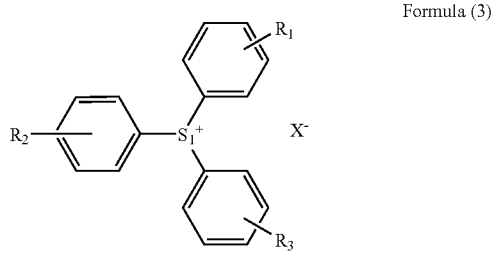

Formula (3)

wherein $R_1$ through $R_3$ independently represent a hydrogen atom or a substituent, provided that $R_1$ through $R_3$ are not simultaneously hydrogen atoms; and $X^-$ represent an anion.

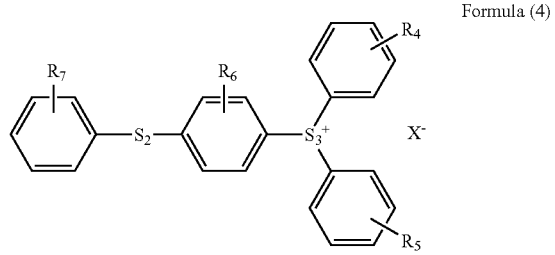

Formula (4)

wherein $R_4$ through $R_7$ independently represent a hydrogen atom or a substituent, provided that $R_4$ through $R_7$ are not simultaneously hydrogen atoms; and $X^-$ represents an anion.

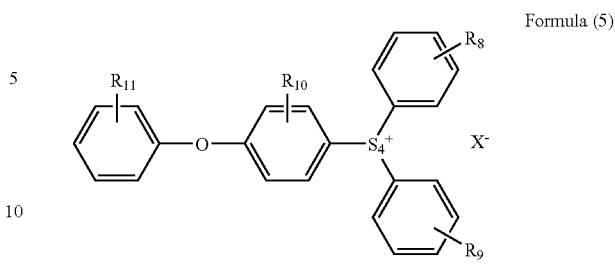

Formula (5)

wherein $R_8$ through $R_{11}$ independently represent a hydrogen atom or a substituent, provided that $R_8$ through $R_{11}$ are not simultaneously hydrogen atoms; and $X^-$ represents an anion.

Formula (6)

wherein $R_{12}$ through $R_{17}$ independently represent a hydrogen atom or a substituent, provided that $R_{12}$ through $R_{17}$ are not simultaneously hydrogen atoms; and $X^-$ represents an anion.

4. The actinic ray curable ink-jet ink composition of item 1 above, further containing a basic compound.

5. The actinic ray curable ink-jet ink composition of item 1 above, further containing a nonionic surfactant.

6. The actinic ray curable ink-jet ink composition of item 1 above, wherein the photopolymerizable compound is an oxetane ring-containing compound.

7. The actinic ray curable ink-jet ink composition of item 1 above, wherein the photopolymerizable compound is an oxirane ring-containing compound.

8. The actinic ray curable ink-jet ink composition of item 1 above, wherein the photopolymerizable compound is a mixture of 30 to 95% by weight of an oxetane ring-containing compound, 5 to 70% by weight of an oxirane ring-containing compound, and 0 to 40% by weight of a vinyl ether compound.

9. The actinic ray curable ink-jet ink composition of item 1 above, further containing colorant such as a dye or pigment.

10. The actinic ray curable ink-jet ink composition of item 9 above, wherein the colorant is pigment.

11. The actinic ray curable ink-jet ink composition of item 1 above, wherein the composition has a viscosity at 25° C. of from 7 to 50 mPa·s.

12. A process of forming an image on a recording sheet employing an ink-jet recording head, the process comprising the steps of ejecting the actinic ray curable ink-jet ink composition of any one of claims 1 through 9 above from the ink-jet recording head onto the recording sheet to form an image on the recording sheet, and exposing the image to actinic rays between 0.001 seconds and 2.0 seconds after the ejected ink composition has arrived at the recording sheet, whereby a cured ink image was formed.

13. The process of item 12 above, wherein the cured image has a thickness of from 2 to 20 μm.

14. The process of item 12 above, wherein the ink-jet recording head is of the line head type.

15. A process of forming an image on a recording sheet employing an ink-jet recording head, the process comprising the steps of ejecting the actinic ray curable ink-jet ink composition of any one of items 1 through 9 above from the ink-jet recording head onto the recording sheet to form an image on the recording sheet, the ink composition being ejected as ink droplets from each of nozzles of the ink-jet recording head, wherein the ink droplets have a volume of from 2 to 15 pl.

16. The process of item 15 above, wherein the cured image has a thickness of from 2 to 20 μm.

17. The process of item 15 above, wherein the ink-jet recording head is of the line head type.

18. An ink-jet recording apparatus used in the process of any one of items 12 through 17 above, the apparatus comprising a heater for heating, to 35 to 100° C., the actinic ray curable ink-jet ink composition and the ink-jet recording head.

1-1. An actinic ray curable ink-jet ink composition containing a sulfonium salt (compound A) as a photoinitiator, which does not release benzene on actinic ray exposure, and a compound (compound B) selected from the group consisting of a polycyclic aromatic compound having a hydroxyl group, a substituted or unsubstituted aralkyloxy group or a substituted or unsubstituted alkoxy group, a carbazole derivative, and a thioxanthone derivative.

1-2. The actinic ray curable ink-jet ink composition of item 1-1 above, wherein the compound B is a carbazole derivative represented by formula (1) or (2) above.

1-3. The actinic ray curable ink-jet ink composition of item 1-1 or 1-2 above, wherein the sulfonium salt, the compound A is a sulfonium salt represented by formula (3), (4), (5), or (6) above.

1-4. The actinic ray curable ink-jet ink composition of any one of items 1-1 through 1-3 above, containing a basic compound.

1-5. The actinic ray curable ink-jet ink composition of any one of items 1-1 through 1-4 above, containing a nonionic surfactant.

1-6. The actinic ray curable ink-jet ink composition of any one of items 1-1 through 1-5 above, containing, as a photopolymerizable compound, an oxetane ring-containing compound.

1-7. The actinic ray curable ink-jet ink composition of any one of items 1-1 through 1-6 above, containing, as a photopolymerizable compound, an oxirane ring-containing compound.

1-8. The actinic ray curable ink-jet ink composition of any one of items 1-1 through 1-7 above, containing, as a photopolymerizable compound, 30 to 95% by weight of an oxetane ring-containing compound, 5 to 70% by weight of an oxirane ring-containing compound, and 0 to 40% by weight of a vinyl ether compound.

1-9. The actinic ray curable ink-jet ink composition of any one of items 1-1 through 1-8 above, wherein the composition has a viscosity at 25° C. of from 7 to 50 mPa·s.

1-10. A process of forming an image on a recording sheet employing an ink-jet recording head, the process comprising the steps of ejecting the actinic ray curable ink-jet ink composition of any one of items 1-1 through 1-9 above from the ink-jet recording head onto the recording sheet to form an image on the recording sheet, and exposing the image to actinic rays between 0.001 seconds and 2.0 seconds after the ejected ink composition has arrived at the recording sheet.

1-11. A process of forming an image on a recording sheet employing an ink-jet recording head, the process comprising the steps of ejecting the actinic ray curable ink-jet ink composition of any one of items 1-1 through 1-9 above from the ink-jet recording head onto the recording sheet to form an image on the recording sheet, and exposing the image to actinic rays to form a cured image, wherein the cured image has a thickness of from 2 to 20 □m.

1-12. A process of forming an image on a recording sheet employing an ink-jet recording head, the process comprising the steps of ejecting the actinic ray curable ink-jet ink composition of any one of items 1-1 through 1-9 above from the ink-jet recording head onto the recording sheet to form an image on the recording sheet, the ink composition being ejected as ink droplets from each of nozzles of the ink-jet recording head, wherein the ink droplets have a volume of from 2 to 15 pl.

1-13. A process of forming an image on a recording sheet employing an ink-jet recording head, the process comprising the steps of ejecting the actinic ray curable ink-jet ink composition of any one of items 1-1 through 1-9 above from the ink-jet recording head onto the recording sheet to form an image on the recording sheet, wherein the ink-jet recording head is of the line head type.

1-14. An ink-jet recording apparatus used in the process of any one of items 1-10 through 1-13 above, the apparatus comprising a heater for heating the actinic ray curable ink-jet ink composition and the ink-jet recording head to 35 to 100° C.

The present invention will be detailed below.

The present inventor has found that an actinic ray curable ink-jet ink composition, containing a sulfonium salt as a photoinitiator, which does not release benzene on actinic ray exposure, and at least one compound selected from the group consisting of a polycyclic aromatic compound having a hydroxyl group, a substituted or unsubstituted aralkyloxy group or a substituted or unsubstituted alkoxy group, a carbazole derivative, and a thioxanthone derivative, provides greatly improved ejection stability and curability without being affected by curing circumstances (such as temperature or humidity), and has completed this invention.

The present inventor has found that the ink composition containing the sulfonium salt, which does not release benzene on actinic ray exposure, gives good ejection stability and curability without being affected by curing circumstances, and the ink composition containing the sulfonium salt and the carbazole derivative represented by formula (1) or (2) above results in more preferred results.

The ink composition described above, further containing an oxetane ring-containing compound, exhibits especially preferred result in ejection stability which is important requirement for ink-jet recording, and allows the size of dots in an image formed after the ink arrives at a recording sheet to easily control, resulting in formation of an image with good reproduction and high quality.

It is preferred that a sulfonium salt releasing no benzene on exposure of an actinic ray is used as a photoinitiator together with a basic compound or a nonionic surfactant, since ejection stability is further improved.

The sulfonium salt (as a photoinitiator) releasing no benzene on exposure of an actinic ray will be explained.

Herein, "a sulfonium salt releasing no benzene on exposure of an actinic ray" refers to a sulfonium salt which does not substantially release benzene on exposure of an actinic ray, and particularly a sulfonium salt such that when a 15 μm thick image with an area of 100 m² is formed employing ink containing the sulfonium salt (as a photoinitiator) in an amount of 5% by weight, and the resulting image is sufficiently exposed at 30° C. to actinic rays so as to completely decompose the sulfonium salt, a releasing amount of benzene is not more than 5 μg or zero. A sulfonium salt, which has a substituent on a benzene ring bonding $^+$S satisfies the above mentioned definition. The sulfonium salt is preferably a sulfonium salt represented by formula 3, 4, 5, or 6 above.

In formulae 3 through 6 above, $R_1$ through $R_{17}$ independently represent a hydrogen atom or a substituent, provided that $R_1$ through $R_3$ are not simultaneously hydrogen atoms, $R_4$ through $R_7$ are not simultaneously hydrogen atoms, $R_8$ through $R_{11}$ are not simultaneously hydrogen atoms, and $R_{12}$ through $R_{17}$ are not simultaneously hydrogen atoms. X$^-$ represents an anion.

Examples of the substituent represented by $R_1$ through $R_{17}$ include an alkyl group such as a methyl group, an ethyl group, a propyl group, an isopropyl group, a butyl group, an isobutyl group, a t-butyl group, a pentyl group, or a hexyl group; an alkoxy group such as a methoxy group, an ethoxy group, a propoxy group, an isopropyl group, a butoxy group, a hexyloxy group, a decyloxy group or a dodecyloxy group; a carbonyl group such as an acetoxy group, a propionyloxy group, a decylcarbonyloxy group, a dodecylcarbonyloxy group, a methoxycarbonyl group, an ethoxycarbonyl group or a benzoyloxy group; a phenylthio group; a halogen atom such as fluorine, chlorine, bromine or iodine; a cyano group; a nitro group; and a hydroxyl group.

X$^-$ represents an anion. Examples thereof include a halogen ion such as F$^-$, Cl$^-$, Br$^-$ or I$^-$, $B(C_6F_5)_4^-$, $R_{18}COO^-$, $R_{19}SO_3^-$, $SbF_6^-$, $AsF_6^-$, $PF_6^-$, and $BF_4^-$, in which $R_{18}$ and $R_{19}$ independently represent an alkyl group such as a methyl group, an ethyl group, a propyl group or a butyl group; an alkyl group having, as a substituent, a halogen atom such as fluorine, chlorine, bromine or iodine, a nitro group, a cyano group, a methoxy group or an ethoxy group; or a phenyl group. Among these, $B(C_6F_5)_4^-$ and $PF_6^-$ are preferred in view of safety.

The above compounds can be easily synthesized according to commonly known methods, for example, in the same manner as the photolytically acid generating agent described in "THE CHEMICAL SOCIETY OF JAPAN", Vol. 71, No. 11 (1998), and "Imejinguyou Yukizairyo", edited by Yuki Erekutoronikus Zairyokenkyukai, and published by Bunshin Shuppan (1993).

In the invention, examples of the sulfonium salt represented by formulae 3 through 6 include the following compounds, but the invention is not limited thereto.

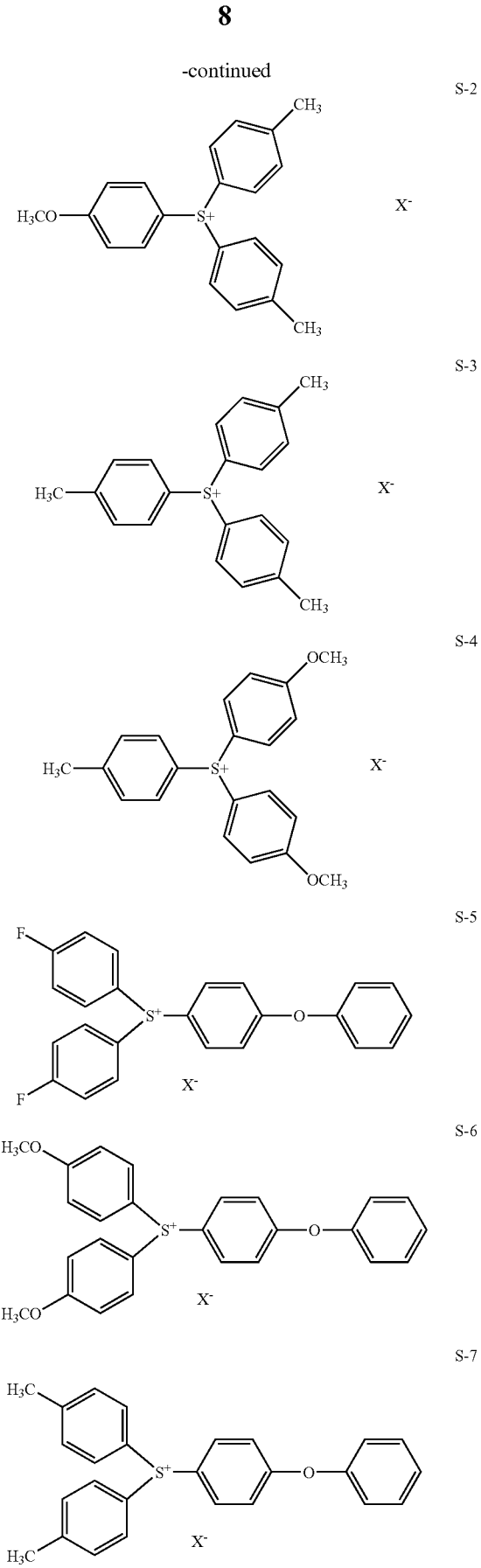

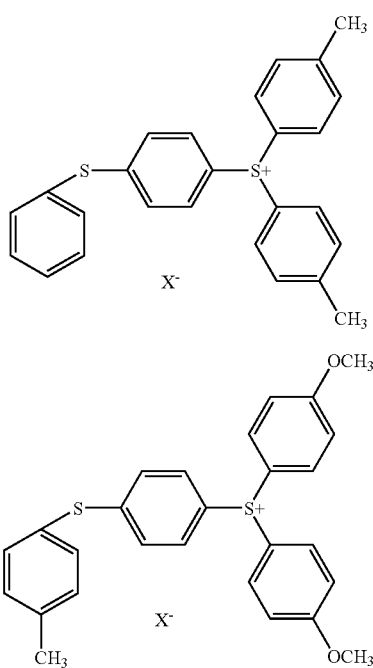

In the chemical structures above, X⁻ represents $PF_6^-$.

The actinic ray curable ink-jet ink composition contains the sulfonium salt (compound (A)) in an amount of preferably from 0.5 to 15% by weight, and more preferably from 1 to 10% by weight.

Next, compound (B), that is, a polycyclic aromatic compound (hereinafter also referred to as the polycyclic aromatic compound in the invention) having, as a substituent, a hydroxyl group, a substituted or unsubstituted aralkyloxy group or an alkoxy group, a carbazole derivative and a thioxanthone derivative will be explained.

The polycyclic aromatic compound in the invention is preferably a naphthalene derivative, an anthracene derivative, a chrysene derivative or a phenanthrene derivative. The alkoxy group has a carbon atom number of preferably from 1 to 18, and more preferably from 1 to 8. The aralkyloxy group has a carbon atom number of preferably from 7 to 10, and is especially preferably a benzyloxy group having a carbon atom number of 7 or a phenethyloxy group having a carbon atom number of 8.

Examples of the compound (B) include a carbazole derivative described later, a naphthalene derivative such as 1-naphthol, 2-naphthol, 1-methoxynaphthalene, 1-stearyloxynaphthalene, 2-methoxynaphthalene, 2-dodecyloxynaphthalene, 4-methoxy-1-naphthol, glycidyl-1-naphthylether, 2-(2-naphthoxy)ethyl vinyl ether, 1,4-dihydroxynaphthalene, 1,5-dihydroxynaphthalene, 1,6-dihydroxynaphthalene, 2,7-dihydroxynaphthalene, 2,7-dimethoxynaphthalene, 1,1-thiobis(2-naphthol), 1,1'-bi-2-naphthol, 1,5-naphthyldiglycidyl ether, 2,7-di(2-vinyloxyethyl)naphthyl ether, 4-methoxy-1-naphthol, ESN-175 (epoxy resin produced by SHINNITTETSU KAGAKU Co., Ltd.) or its series, or a condensation product of a naphthol derivative with formalin; an anthracene derivative such as 9,10-dimethoxyanthracene, 2-ethyl-9,10-dimethoxyanthracene, 2-tert-butyl-9,10-dimethoxyanthracene, 2,3-dimethyl-2-ethyl-9,10-dimethoxyanthracene, 9-methoxy-10-methylanthracene, 9,10-diethoxyanthracene, 2-ethyl-9,10-diethoxyanthracene, 2-t-butyl-9,10-diethoxyanthracene, 2,3-dimethyl-9,10-diethoxyanthracene, 9-ethoxy-10-methylanthracene, 9,10-dimethoxyanthracene, 9-methoxy-10-methylanthracene, 9,10-dipropoxyanthracene, 2-ethyl-9,10-dipropoxyanthracene, 2-t-butyl-9,10-dipropoxyanthracene, 2,3-dimethyl-9,10-dipropoxyanthracene, 9-ethoxy-10-methylanthracene, 9,10-dimethoxyanthracene, 9-isopropoxy-10-methylanthracene, 9,10-dibenzyloxyanthracene, 2-ethyl-9,10-dibenzyloxyanthracene, 2-t-butyl-9,10-dibenzyloxyanthracene, 2,3-dimethyl-9,10 dibenzyloxyanthracene, 9-benzyloxy-10-methylanthracene, 9,10-di-α-methylbenzyloxyanthracene, 2-ethyl-9,10-di-α-methylbenzyloxyanthracene, 2-t-butyl-9,10-di-α-methylbenzyloxyanthracene, 2,3-dimethyl-9,10-di-α-methylbenzyloxyanthracene, 9-(α-methylbenzyloxy)-10-methylanthracene, 9,10-di(2-hydroxyethoxy)anthracene, or 2-ethyl-9,10-di(2-carboethoxy)anthracene; a chrysene derivative such as 1,4-dimethoxychrysene, 1,4-diethoxychrysene, 1,4-dipropoxychrysene, 1,4-dibenzyloxychrysene, or 1,4-di-α-methylbenzyloxychrysene; and a phenanthrene derivative such as 9-hydroxyphenanthrene, 9,10-dimethoxyphenanthrene, or 9,10-diethoxyphenanthrene. Among these derivatives, a 9,10-dialkoxyanthracene derivative, which may have an alkyl group having a carbon atom number of 1 to 4 as a substituent, is preferred, wherein the alkoxy is preferably methoxy or ethoxy.

Examples of the thioxanthone derivative include thioxanthone, 2,4-dimethylthioxanthone, 2,4-diethylthioxanthone, isopropylthioxanthone, and 2-chlorothioxanthone.

The compound (B) especially preferably used in the invention is a carbazole derivative represented by formula 1 or 2 above.

In the formula 1 or 2, R and R' independently represent a fluorine atom, a chlorine atom, a bromine atom, a hydroxyl group, a mercapto group, a nitro group or a monovalent organic group having a carbon atom number of from 1 to 19. Examples of the monovalent organic group having a carbon atom number of from 1 to 19 include a straight-chained, branched or cyclic alkyl group having a carbon atom number of from 1 to 18, a straight-chained, branched or cyclic alkenyl group having a carbon atom number of from 2 to 18, a monocyclic or polycyclic aryl group having a carbon atom number of from 6 to 18, a monocyclic or polycyclic arylalkyl group having a carbon atom number of from 7 to 18, a straight-chained, branched or cyclic alkoxyl group having a carbon atom number of from 1 to 18, a monocyclic or polycyclic aryloxy group having a carbon atom number of from 6 to 18, a straight-chained, branched or cyclic aliphatic group having a carbon atom number of from 1 to 18, a monocyclic or polycyclic arylcarbonyl group having a carbon atom number of from 7 to 19, a straight-chained, branched or cyclic alkoxycarbonyl group having a carbon atom number of from 2 to 19, and a monocyclic or polycyclic aryloxycarbonyl group having a carbon atom number of from 7 to 19. These organic groups may have a substituent such as a fluorine atom, a chlorine atom, a bromine atom, a hydroxyl group, a carboxyl group, a mercapto group, a cyano group or a nitro group. In the formula 1 or 2, Y and Y' independently represent a monovalent organic group having a carbon atom number of from 1 to 18, for example, a straight-chained, branched or cyclic alkyl group having a carbon atom number of from 1 to 18, a straight-chained, branched or cyclic alkenyl group having a carbon atom number of from 2 to 18, or a monocyclic or polycyclic aryl group having a carbon atom number of from 6 to 18.

Examples of the straight-chained, branched or cyclic alkyl group having a carbon atom number of from 1 to 18, which may have a substituent such as a fluorine atom, a chlorine atom, a bromine atom, a hydroxyl group, a carboxyl group, a mercapto group, a cyano group or a nitro group, include a methyl group, an ethyl group, an n-propyl group, an i-propyl group, an n-butyl group, an i-butyl group, a sec-butyl group, a t-butyl group, an n-pentyl group, an i-pentyl group, a cyclopentyl group, a hexyl group, a cyclohexyl group, a heptyl group, a cycloheptyl group, a cycloheptyl group, an octyl group, a nonyl group, a decyl group, a dodecyl group, a tetradecyl group, an octadecyl group, a fluoromethyl group, a chloromethyl group, a trifluoromethyl group, a carboxymethyl group, a mercaptomethyl group, a cyanomethyl group, a nitromethyl group, and an azidomethyl group.

Examples of the straight-chained, branched or cyclic alkenyl group having a carbon atom number of from 2 to 18, which may have a substituent such as a fluorine atom, a chlorine atom, a bromine atom, a hydroxyl group, a carboxyl group, a mercapto group, a cyano group or a nitro group, include a vinyl group, a propenyl group (an allyl group), an isopropenyl group, a butenyl group, a 2-methyl-1-propenyl group, a 2-methylallyl group, a hexenyl group, a cyclohexenyl group, a 1-octenyl group, a 1-cyclohexenyl group, a trifluoroethenyl group, a 1-chloroethenyl group and 4-hydroxy-1-butenyl group.

Examples of the monocyclic or polycyclic aryl group having a carbon atom number of from 6 to 18, which may have a substituent such as a fluorine atom, a chlorine atom, a bromine atom, a hydroxyl group, a carboxyl group, a mercapto group, a cyano group or a nitro group, include a phenyl group, a tolyl group, a xylyl group, a cumeryl group, a mesityl group, a 1-naphthyl group, a 2-naphthyl group, a 1-pyrenyl group, a p-cumenyl group, an o-fluorophenyl group, a p-mercaptophenyl group and a p-cyanophenyl group.

Examples of the monocyclic or polycyclic arylalkyl group having a carbon atom number of from 7 to 18, which may have a substituent such as a fluorine atom, a chlorine atom, a bromine atom, a hydroxyl group, a carboxyl group, a mercapto group, a cyano group or a nitro group, include a benzyl group, a p-tolylmethyl group, a 2-naphtylmethyl group, an o-fluorobenzyl group, a p-hydroxybenzyl group, a phenetyl group, a styryl group, and a cinnamyl group.

Examples of the straight-chained, branched or cyclic alkoxy group having a carbon atom number of from 1 to 18, which may have a substituent such as a fluorine atom, a chlorine atom, a bromine atom, a hydroxyl group, a carboxyl group, a mercapto group, a cyano group or a nitro group, include a methoxy group, an ethoxy group, a propoxy group, an isopropoxy group, a butoxy group, a pentyloxy group, a cyclohexyloxy group, an octyloxy group, a fluoromethoxy group, a chloromethoxy group, a trifluoromethoxy group, a hydroxymethoxy group, a carboxymethoxy group, a mercaptomethoxy group, and a cyanomethoxy group.

Examples of the monocyclic or polycyclic aryloxy group having a carbon atom number of from 6 to 18, which may have a substituent such as a fluorine atom, a chlorine atom, a bromine atom, a hydroxyl group, a carboxyl group, a mercapto group, a cyano group or a nitro group, include a phenoxy group, a 1-naphtoxy group, a 2-naphtoxy group, a 5-naphthacenyl group, a 1-indenyloxy, an o-tolyloxy group, a 2,3-xylyloxy group, a p-cumenyloxy group, a p-cyclohexylphenoxy group, an o-fluorophenoxy group, and an o-mercaptophenoxy group.

Examples of the straight-chained, branched or cyclic aliphatic group having a carbon atom number of from 1 to 18, a monocyclic or polycyclic arylcarbonyl group having a carbon atom number of from 7 to 19, each of which may have a substituent such as a fluorine atom, a chlorine atom, a bromine atom, a hydroxyl group, a carboxyl group, a mercapto group, a cyano group or a nitro group, include a formyl group, an acetyl group, a propionyl group, a butyryl group, an isobutyryl group, an isovaleryl group, a pivaloyl group, a hexanoyl group, a lauroyl group, a palmitoyl group, a stearoyl group, a cyclohexylcarbonyl group, as benzoyl group, a 1-naphtoyl group, a 2-naphtoyl group, a chloroacetyl group, a hydroxyacetyl group, and a cyanoacetyl group.

Examples of the straight-chained, branched or cyclic alkoxycarbonyl group-having a carbon atom number of from 2 to 19, which may have a substituent such as a fluorine atom, a chlorine atom, a bromine atom, a hydroxyl group, a carboxyl group, a mercapto group, a cyano group or a nitro group, include a methoxycarbonyl group, an ethoxycarbonyl group, a propoxycarbonyl group, a butoxycarbonyl group, an isopropoxycarbonyl group, a t-butoxycarbonyl group, a fluoromethoxycarbonyl group, a chloromethoxycarbonyl group, a carbomethoxycarbonyl group, a cyanomethoxycarbonyl group, and a nitromethoxycarbonyl group.

Examples of the monocyclic or polycyclic aryloxycarbonyl group having a carbon atom number of from 7 to 19, which may have a substituent such as a fluorine atom, a chlorine atom, a bromine atom, a hydroxyl group, a carboxyl group, a mercapto group, a cyano group or a nitro group, include a phenoxycarbonyl group, a 1-naphtyloxycarbonyl group, a 2-naphtyloxycarbonyl group, a tolyloxycarbonyl group, a xylyloxycarbonyl group, a chlorophenoxycarbonyl group, a p-hydroxyphenoxycarbonyl group, and an m-azidophenoxycarbonyl group.

Among the above substituents, the preferred R or R' is a methyl group, an ethyl group, an n-propyl group, an i-propyl group, a t-butyl group, a formyl group, an acetyl group, a propionyl group, a benzoyl group, or a naphtoyl group. The number k or k' of the substituents represents an integer of from 0 to 4, and preferably from 0 to 2 in view of sensitization effect of a photosensitizing agent. When k or k' exceeds 2, the sensitization effect may deteriorate. Y and Y' in formula (1) or (2) independently represent an organic group having a carbon atom number of from 1 to 18, for example, for example, a straight-chained, branched or cyclic alkyl group having a carbon atom number of from 1 to 18, a straight-chained, branched or cyclic alkenyl group having a carbon atom number of from 2 to 12, or a monocyclic or polycyclic aryl group having a carbon atom number of from 6 to 12. Examples of the straight-chained, branched or cyclic alkyl group having a carbon atom number of from 1 to 18, include a methyl group, an ethyl group, an n-propyl group, an i-propyl group, an n-butyl group, an i-butyl group, a sec-butyl group, a t-butyl group, an n-pentyl group, an i-pentyl group, a cyclopentyl group, a hexyl group, a cyclohexyl group, a heptyl group, a cycloheptyl group, a cycloheptyl group, an octyl group, a nonyl group, a decyl group, a dodecyl group, a tetradecyl group, and an octadecyl group.

Examples of the straight-chained, branched or cyclic alkenyl group having a carbon atom number of from 2 to 18 include a vinyl group, a propenyl group (an allyl group), an isopropenyl group, a butenyl group, a 2-methyl-1-propenyl group, a 2-methylallyl group, a hexenyl group, a cyclohexenyl group, a 1-octenyl group, and a 1-cyclohexenyl group.

Examples of the monocyclic or polycyclic aryl group having a carbon atom number of from 6 to 18 include a phenyl group, a tolyl group, a xylyl group, a cumeryl group, a mesityl group, a 1-naphthyl group, a 2-naphthyl group, a 1-pyrenyl group, and a p-cumenyl group. When Y and Y' in the carbazole compound used in the invention are hydrogens, the carbazole compound neutralizes an acid generated by light and inhibits cationic polymerization. Therefore, Y and Y' should be a substituent other than hydrogen. When Y and Y' each are a monovalent organic group having a carbon atom number of from 1 to 12, the carbazole compound exhibits sensitization effect and does not inhibit cationic polymerization. The preferred Y and Y' each are a methyl group, an ethyl group or a vinyl group.

Examples of the carbazole derivative used in the invention N-methylcarbazole, N-ethylcarbazole (hereinafter referred to as "NEC"), N-propylcarbazole, N-butylcarbazole, N-vinylcarbazole, 1,3,6,8,9-pentamethylcarbazole, 1,4,5,8,9-pentamethylcarbazole (hereinafter referred to as "NMPC"), 3-formyl-N-ethylcarbazole, N-phenylcarbazole, N-ethyl-3,6-bis(benzoyl)-carbazole (hereinafter referred to as "NEBC"), and 9,9'-diethyl-3,3'-dicarbazole (hereinafter referred to as "NEDC"). The above carbazole compounds can be used singly or as an admixture of two or more kinds thereof.

The actinic ray curable ink-jet ink composition contains the compound B in an amount of preferably from 0.05 to 5% by weight, and more preferably from 0.1 to 3% by weight.

In the invention, in order to improve ink ejection stability, a basic compound is preferably used in combination.

As the basic compound, known various basic compounds can be used. Typical examples thereof include a basic alkali metal compound, a basic alkali earth metal compound, and a basic organic compound such as an amine.

As the basic alkali metal compounds, listed are alkali metal hydroxides (such as lithium hydroxide, sodium hydroxide and potassium hydroxide), alkali metal carbonates (such as lithium carbonate, sodium carbonate and potassium carbonate), and alkali metal alcoholates (such as sodium methoxide, sodium ethoxide, potassium methoxide and potassium ethoxide).

As the basic alkaline earth metal compounds, listed are alkaline earth metal hydroxides (such as magnesium hydroxide and calcium hydroxide), alkaline earth metal carbonates (such as magnesium carbonate and calcium carbonate), and alkaline earth metal alcoholates (such as magnesium methoxide).

As the basic organic compounds, listed are amines and nitrogen containing heterocyclic compounds such as quinoline and quinolizine. Of these, amines are preferable from the viewpoint of compatibility with a photopolymerizable monomer, for example, octylamine, naphthylamine, xylenediamine, dibenzylamine, diphenylamine, dibutylamine, trioctylamine, tetramethylethylenediamine, tetramethyl-1,6-hexamethylenediamine, hexamethylenetetramine, and triethanolamine.

The concentration of the basic compound is from 10 to 1,000 ppm by weight, and preferably from 20 to 500 ppm by weight, based on the total weight of the photopolymerizable monomer. The basic compound may be used alone or in combinations of a plurality thereof.

In this invention, to further enhance ejection stability, a nonionic surface active agent is preferably used in combination.

As the nonionic surface active agent usable in this invention, there are a polyoxyethylene-polyoxypropilene condensate, polyoxyethylene lauryl ether, a secondary alcohol ethoxylate, a primary alcohol ethoxylate, a nonylphenol ethoxylate, an octylphenol ethoxylate, an oleyl alcohol ethoxylate, a lauryl alcohol ethoxylate, polyethylene glycol, polyoxyethylene glycol oleate, sorbitan stearyl ester, sorbitan oleyl ester, polyoxyethylene sorbitan oleyl ester, or an acryl copolymer of a hydroxyl group-containing unsaturated monomers such as 2-hydroxyethyl methacrylate, 4-hydroxybutyl acrylate, and a polyethylene glycol monomethyl ether. Further, listed are alcohols such as isopropyl alcohol, n-butyl alcohol, propylene glycol monomethyl ether, and propylene glycol monobutyl ether and glycol ethers. These nonionic surface active agents may be used alone or a mixture of two or more kinds thereof.

In this invention, a specifically preferable nonionic surface active agent is a fluorine-containing surface active agent which has a perfluoroalkyl group in the molecule. Examples of the fluorine-containing surface active agent which has a perfluoroalkyl group in the molecule usable in this invention include a perfluoroalkyl ethylene oxide addition product, a perfluoroalkylamine oxide, and a perfluoroalkyl containing oligomer, specifically, for example, SURFLON S-141, SURFLON S-145, SURFLON S-381, SURFLON S-383, SURFLOM S-393, SURFLON SC-101, SURFLON SC-105, SURFLON KH-40 and SURFLON SA-100 (each being products of SEIMI CHEMICAL Co., Ltd.), and MEGAFAC F-171, MEGAFAC F-172, MEGAFAC F-173, MEGAFAC F-177, MEGAFAC F-178A, MEGAFAC F-178K, MEGAFAC F-179, MEGAFAC F-183, MEGAFAC F-184, MEGAFAC F-185, MEGAFAC F-470, and MEGAFAC F-471 (each being products of DAINIPPON INK AND CHEMICALS, INCORPORATED) (see reference literature; Chemical Products 13,700, pp. 1,239-1,242, The Chemical Daily, Co., Ltd. (2000)). The fluorine-containing surface active agent which has a perfluoroalkyl group in the molecule may be used alone or as a mixture of two or more kinds thereof.

The active ray-curable ink-jet ink in the invention preferably contains an oxetane compound having an oxetane ring as a photopolymerizable compound.

The oxetane compound usable in the present invention refer to a compound having an oxetane ring. Any appropriate oxetane compound known in the art can be used which is disclosed in for example, in Japanese Patent O.P.I. Publication Nos. 2001-220526 and 2001-310937. Further, in this invention, from the viewpoint of enhancement of better curability and ejection stability, it is preferable to contain a compound having at least one oxirane group.

As a photopolymerizable monomer, a cationically polymerizable monomer, well known in the art, can be employed. For example, listed are epoxy compounds, vinyl ether compounds, and oxetane compounds which are described in Japanese Patent O.P.I. Publication Nos. 6-9714, 2001-31892, 2001-40068, 2001-55507, 2001-310938, 2001-310937, and 2001-220526.

As the epoxy compound, there are an aromatic epoxide, an alicyclic epoxide, and an aliphatic epoxide as described below.

A preferable aromatic epoxide is a di- or poly-glycidyl ether manufactured by a reaction of polyhydric phenol having at least one aromatic ring or of an alkylene oxide adduct thereof with epichlorohydrin, and includes, for example, such as di- or poly-glycidyl ether of bisphenol A or of an alkylene oxide adduct thereof, di- or poly-glycidyl ether of hydrogenated bisphenol A or of an alkylene oxide adduct thereof and novolac type epoxy resin. Herein, alkylene oxide includes such as ethylene oxide and propylene oxide.

An alicyclic epoxide is preferably a compound containing cyclohexene oxide or cyclopentene oxide obtained by epoxydizing a compound having at least one cycloalkane ring such as cyclohexene or cyclopentene by use of a suitable oxidizing agent such as hydrogen peroxide or a peracid.

A preferable aliphatic epoxide is such as di- or polyglycidyl ether of aliphatic polyhydric alcohol or of an alkylene oxide adduct thereof; the typical examples include diglycidyl ether of alkylene glycol, such as diglycidyl ether of ethylene glycol, diglycidyl ether of propylene glycol and diglycidyl ether of 1,6-hexane diol; polyglycidyl ether of polyhydric alcohol such as di- or triglycidyl ether of glycerin or of an alkylene oxide adduct thereof; and diglycidyl ether of polyalkylene glycol such as diglycidyl ether of polyethylene glycol or of an alkylene oxide adduct thereof and diglycidyl ether of polypropylene glycol or of an alkylene oxide adduct thereof. Herein, alkylene oxide includes such as ethylene oxide and propylene oxide.

Among these epoxides, aromatic epoxide and alicyclic epoxide are preferable and alicyclic epoxide is specifically preferable, taking a quick curing property in consideration. In the invention, one kind of epoxides described above alone may be utilized, and suitable combinations of two or more kinds thereof may also be utilized.

In the invention, at least one of epoxidated fatty acid ester or epoxidated glyceride is preferably used as the oxirane ring-containing compound, in view of AMES or sensitization.

The epoxidated fatty acid ester or epoxidated glyceride is obtained by incorporating an epoxy group into fatty acid ester or glyceride, and can be used without any limitations. As the epoxidated fatty acid ester, there is one manufactured by epoxidation of oleic acid ester, and examples thereof include epoxy methyl stearate, epoxy butyl stearate, and epoxy octyl stearate. Similarly, as the epoxidated glyceride, there is one manufactured by epoxidation of soybean oil, linseed oil or castor oil, and examples thereof include epoxy soybean oil, epoxy linseed oil and epoxy castor oil.

In the invention, any known vinyl ether compounds can be used.

Examples of the vinyl ether compound contained in the ink-jet ink of the invention include di- or tri-vinyl ether compounds such as ethylene glycol divinyl ether, diethylene glycol divinyl ether, triethylene glycol divinyl ether, propylene glycol divinyl ether, dipropylene glycol divinyl ether, butane diol divinyl ether, hexane diol divinyl ether, cyclohexane dimethanol divinyl ether, and trimethylol propane trivinyl ether; and mono vinyl ether compounds such as ethylene glycol monovinyl ether, ethyl vinyl ether, n-butyl vinyl ether, iso-butyl vinyl ether, octadecyl vinyl ether, cyclohexyl vinyl ether, hydroxybutyl vinyl ether, 2-ethylhexyl vinyl ether, cyclohexane dimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether.

In these vinyl ether compounds, when the hardenability, adhesion or surface hardness is considered, di- or tri-vinyl ether compounds-are preferable, and particularly divinyl ether compounds are preferable. In the present invention, these vinyl ether compounds may be used alone or as an admixture of two or more kinds thereof.

In the invention, ink-jet ink preferably contains, as photopolymerizable compounds, 30 to 95% by weight of a compound having an oxetane ring, 5 to 70% by weight of a compound having an oxirane ring, and 0 to 40% by weight of a vinyl ether compound, which further enhances both curability and ejection stability.

Combined use of a monofunctional oxetane compound with one oxetane ring and a polyfunctional oxetane compound with two or more oxetane rings is preferred in increasing strength of a cured ink layer and adhesion to a recording sheet. The oxetane compound used in the invention is preferably an oxetane compound with one to four oxetane rings.

The actinic ray curable ink of the invention contains preferably any known colorants such as dye or pigment, and preferably pigment.

Pigments preferably utilized in the invention will be listed below:

C.I. Pigment Yellow-1, 3, 12, 13, 14, 17, 81, 83, 87, 95, 109, 42,

C.I. Pigment Orange-16, 36, 38,

C.I. Pigment Red-5, 22, 38, 48:1, 48:2, 48:4, 49:1, 53:1, 57:1, 63:1, 144, 146, 185, 101, C.I. Pigment Violet-19, 23, C.I. Pigment Blue-15:1, 15:3, 15:4, 4, 18, 60, 27, 29, C.I. Pigment Green-7, 36, C.I. Pigment White-6, 18, 21, C.I. Pigment Black-7, Further, in the invention, white ink is preferably utilized to increase a covering power of colors with transparent base materials such as a plastic film. It is preferable to utilize white ink, specifically in light package printing and label printing, however, due to increase of ejection amount, the using amount is necessarily limited in respect to the above-mentioned ejection stability, and generation of curl and wrinkles of a recording material.

To disperse the above-described pigment, for example, a ball mill, a sand mill, an attritor mill, a roll mill, an agitator, a Henshel mixer, a colloidal mixer, a ultrasonic homogenizer, a pearl mill, a wet jet mill, a paint shaker, etc. can be utilized. Further, a dispersant can be added at dispersion of a pigment. As a dispersant, a polymer dispersant is preferably utilized and Solsperse Series manufactured by Avecia Co. is included. Further, as a dispersion aid, a synergist coresponding to each kind of a pigment can also be utilized. The dispersant and dispersion aid are preferably added in a range of from 1 to 50 weight parts based on 100 parts of a pigment. As a dispersion medium, a solvent or a polymerizable compound is utilized, however, the actinic ray curable ink used in the invention is preferably an ink containing no solvent, since curing was carried out immediately after the ink was deposited on recording material. When a solvent is left in a cured image, there caused problems of deterioration of resistance against solvents and VOC of residual solvent. Therefore, as a dispersion medium, polymerizable compounds are used but a solvent not. Particularly monomers having the lowest viscosity among them are preferably used in view of dispersion suitability.

In dispersion of a pigment, selection of a pigment, a dispersant and a dispersion medium, dispersion conditions and filtering conditions are suitably set so as to make a mean particle diameter of a pigment of preferably from 0.08 to 0.5 µm and the maximum particle diameter of from 0.3 to 10 µm and preferably from 0.3 to 3 µm. By this particle diameter control, it is possible to depress clogging of a head nozzle and maintain keeping stability of ink, as well as transparency and curing sensitivity of ink.

In ink according to the invention, colorant concentration is preferably from 1 to 10 weight % based on the total ink.

Various kinds of additives other than those explained above can be added to the actinic ray curable ink of the invention. For example, a surfactant, a leveling additive, a matting agent, polyester type resin, polyurethane type resin, vinyl type resin, acryl type resin, rubber type resin and wax series can be added to the ink when necessary. The actinic ray curable ink of the invention may be a radical and cationic polymerization hybrid curable ink further containing a radical polymerization composition comprising a radical polymerization monomer and a radical initiator.

It is preferred that the ink of the invention has an ink viscosity at 25° C. of from 7 to 50 mPa·s, since it provides good ejection stability and good curability, regardless of ambient atmosphere conditions (such as temperature and humidity).

As a recording material used in the invention, besides ordinary non-coated paper or coated paper, various non-absorptive plastics or their films, which are used in a so-called light packaging, can be utilized. Examples of the plastic films include for example, a PET film, an OPS film, an OPP film, an ONy film, a PVC film, a PE film and a TAC film. As plastic films other than these, polycarbonate, acryl resin, ABS, polyacetal, PVA and a rubber series can be utilized. A metal series and a glass series are also applicable. The constitution of the invention becomes more effective especially when an image is formed particularly on a PET film, an OPS film, an OPP film, an ONy film and a PVC film, which are capable of thermally shrinking, of these recording materials. Generally, these recording materials are liable to cause curl and deformation of film due to such as curing shrinkage or heat generation at curing reaction of ink, and, in addition, a formed ink layer is hard to follow shrinkage of the materials.

Plastic films greatly differ in surface energy depending on the kinds, and heretofore, there has been a problem in that the ink dot diameter after ink deposition on recording material varies depending on the kinds of the recording materials. The constitution of the invention can form an image with high precision on recording materials having a surface energy of from 35 to 60 mN/m, the recording materials ranging from those having a low surface energy such as an OPP or OPS film to those having a relatively high surface energy such as a PET film.

In the invention, a long length roll (web) of a recording material is advantageously utilized in respect to a cost of a recording material such as a packaging cost and a manufacturing cost, an efficiency of print preparation and applicability to variety of print sizes.

An image forming method of the invention will be explained.

In the image forming method in the invention, it is preferred that the ink described above be ejected onto a recording material according to an ink jet recording method, and then cured by irradiation of actinic ray such as UV ray.

(Thickness of Ink Layer Formed after Ink is Ejected onto Recording Material)

In the invention, the thickness of an ink layer, after ink has been ejected onto recording material and cured by actinic ray irradiation, is preferably from 2 to 20 μm. In actinic ray curable ink jet recording in the field of screen printing, the thickness of the ink is at present over 20 μm. Ink ejecting to give an excessive layer thickness is not preferred in the field of flexible package printing where a thin plastic film is used as a recording material, because problems are caused in that stiffness and texture of printed matter vary, in addition to problems of the aforementioned curl and wrinkles of recording material.

Herein, the thickness of ink layer refers to a maximum thickness of the ink layer deposited on recording material. This applies to a single color ink layer, and an overlapped layer of two different color (secondary color) inks, three different color inks or four different color inks (including white ink as a base ink), which are formed on recording material according to an ink jet recording process.

(Conditions of Ink Ejection)

As conditions of ink ejection, ink ejection is preferably performed while a recording head and ink being heated at from 35 to 100° C. in respect to ejection stability. Since actinic ray curable ink shows a large viscosity variation width depending on temperature variation and which in turn significantly influences a liquid droplet size and a liquid droplet ejection speed resulting in deterioration of image quality, it is required to keep an ink temperature constant while raising the ink temperature. A control width of ink temperature is a set temperature ±5° C., preferably a set temperature ±2° C. and furthermore preferably a set temperature ±1° C.

The droplet volume of the ink ejected from each ink nozzle is preferably 2 to 15 pl.

The droplet volume of the ink has to be in the range described above to form images with high resolution, however, this droplet volume tends to lower the aforementioned ejection stability. In the invention, even when a small droplet volume such as 2 to 15 μl is ejected, ejection stability is improved, and images with high resolution can be formed.

(Actinic Ray Irradiation Condition after Ink has Been Ejected onto Recording Material)

In an image recording method of the invention, it is preferred that actinic ray is irradiated 0.001 to 2.0 seconds after ink has been ejected on recording material, and it is more preferred that actinic ray is irradiated 0.001 to 1.0 second after ink has been ejected on recording material. It is specifically important that the irradiation timing be as early as possible in order to form an image with high resolution.

As an actinic ray irradiation method, a basic method is disclosed in JP-A No. 60-132767, in which light sources are provided at the both sides of a head unit where a head and a light are scanned in a shuttle mode. Irradiation is performed in a certain time interval after ink has been ejected onto recording material. Further, curing is completed by another light source which is not driven. As a light irradiation method, a method utilizing optical fiber, and a method in which collimated light source is reflected by a mirror provided on the side surface of a head unit and UV light (ultraviolet light) is irradiated on a recording portion are disclosed in U.S. Pat. No. 6,145,979. In an image forming method of the invention, any of these irradiation methods can be utilized.

Further, a method is also a preferable embodiment, in which actinic ray irradiation is divided into two steps; firstly, a first actinic ray irradiation is carried between the period from 0.001 to 2.0 seconds after ink was deposited on recording material by the above-described method and further a second actinic ray irradiation is carried after printing has been completed. Shrinkage of recording materials caused at the time of ink curing can be depressed by dividing actinic ray irradiation into two steps.

Heretofore, in a UV ink jet method, it has been usual to utilize a light source of high illuminance having a power exceeding 1 kW·hr in order to minimize widening of dots and bleeding-out caused after ink deposition on recording material. However, particularly in such as a shrink label, utilizing the light sources makes shrinkage of a recording material too large to be used practically at present.

In the invention, an actinic ray having a maximum illuminance in a wavelength range from 280 to 320 nm is preferably used, and even when a light source a power exceeding 1 kW·hr is used, images with high resolution can be formed, and shrinkage of a recording material is in the permissible range.

In the invention, the power of light sources irradiating an actinic ray is preferably less than 1 kW·hr. Examples of the light sources having a power of less than 1 kW-hr include a fluorescent lamp, a cold cathode tube and an LED, but are not limited thereto.

An ink jet recording apparatus (hereinafter also referred to as a recording apparatus) in the invention will be explained.

Next, the recording apparatus in the invention will be explained suitably in reference to a drawing. Herein, the recording apparatus of the drawing is only an embodiment of a recording apparatus of the invention, and a recording apparatus of the invention is not limited to the drawing.

FIG. 1 shows a front view of one embodiment of the main section of the ink-jet recording apparatus of the invention.

Recording apparatus 1 is equipped with head carriage 2, recording head 3, irradiation means 4 and platen portion 5. In recording apparatus 1, platen portion 5 is arranged under recording material P. Platen portion 5 has a UV ray absorbing function, and absorbs extra UV ray having passed through recording sheet P. As a result, images with high resolution can be reproduced quite stably.

Recording sheet P is guided by guide member 6 to be moved to the back side from the front side in FIG. 1 by operation of a transport means (not illustrated). Scan of recording heads 3 held in the head carriage 2 is made by reciprocating head carriage 2 in the R direction in FIG. 1 according to a head scanning means (not illustrated).

Head carriage 2 is provided over recording sheet P, and stores recording heads 3 described below with the ink ejection outlets arranged downward, the number of recording heads 3 being the same as that of different color inks used in an ink image formed on the recording sheet. Head carriage 2 is provided in the main body of recording apparatus 1 so as to reciprocate in the R direction shown in FIG. 1 by a drive of a head scanning means.

Herein, FIG. 1 illustrates that head carriage 2 is supposed to store recording heads 3 each containing a white ink composition W, a yellow ink composition Y, a magenta ink composition M, a cyan ink composition C, a black ink composition K, a light yellow ink composition Ly, a light magenta ink composition Lm, a light cyan ink composition Lc, a light black ink composition Lk and a white ink composition W, however, the number of recording heads 3 stored in head carriage 2 in practical operation is suitably determined.

Recording heads 3 eject an actinic ray curable ink (for example, UV curable ink) to be supplied by means of an ink supplying means (not illustrated) from the ink ejection outlets onto recording sheet P by action of plural ejecting means (not illustrated) equipped in the recording apparatus. Ink to have been ejected from recording heads 3 is cured by UV irradiation.

The recording heads 3 eject ink as ink droplets onto a pre-determined region (a region capable of receiving the ink) of recording sheet P while the scan of the head is made in which the head moves from one edge to another of the recording sheet in the R direction in FIG. 1 by drive of the head scanning means, whereby the ink is deposited on that region of the recording sheet.

The above scan is suitably made several times to eject ink onto one region of recording sheet. After that, while the recording sheet P is transported from the front side to the back side of the page in FIG. 1 by a transport means and the scan of the recording heads 3 is again made by the head scan means, ink is ejected from the recording heads onto a region adjacent to the one region of the recording sheet transported to the back side of the page.

The above operation is repeated, whereby the ink is ejected from recording heads 3 employing the head scan means and the transport means to form an image comprised of aggregates of ink droplets on recording sheet P.

Irradiation means 4 is equipped with a UV lamp which emits ultraviolet ray with a specific wavelength region at a stable exposure energy and a filter which transmits ultraviolet ray with a specific wavelength. Herein, Examples of the UV lamp include a mercury lamp, a metal halide lamp, an excimer laser, a UV laser, a cold cathode tube, a black light, and an LED, and a metal halide lamp tube, a cold cathode tube, a mercury lamp tube and a black light, having a band-shape, are preferable. Specifically a cold cathode tube and a black light which emit a 365 nm ultraviolet ray are preferable, which can prevent bleeding-out, efficiently control a dot diameter, and reduce wrinkles on curing. Utilizing a black light as a radiation source of irradiation means 4 reduces a manufacturing cost of irradiation means 4 for ink curing.

Irradiation means 4 has the possible largest size which can be installed in the recording apparatus 1 (an ink jet printer) or the irradiation region of the irradiation means 4 is larger than the largest region of recording sheet, onto which ink is ejected by one time scan of recording heads 3 driven by the head scanning means.

The irradiation means 4 is arranged nearly in parallel with recording sheet 4 at the both sides of head carriage 2, and fixed.

In order to adjust illuminance at the ink ejection outlets, the whole of recording heads 3 is light-shielded, however, in addition, it is preferable to make distance h2 between the ink ejection outlet 31 of recording heads 3 and recording sheet P longer than distance h1 between irradiation means 4 and recording sheet P (h1<h2) or to make distance d between recording heads 3 and irradiation means 4 long (to make d large). Further, it is more preferable to provide bellows structure 7 between recording heads 3 and irradiation means 4.

Herein, the wavelength of ultraviolet rays, which are irradiated through irradiation means 4 can be suitably changed by exchange of a UV lamp or a filter, which is installed in irradiation means 4.

The ink-jet ink of the invention has excellent ejection stability, and when an image is recorded employing a line head type ink-jet recording apparatus, is especially useful.

Figure 2:
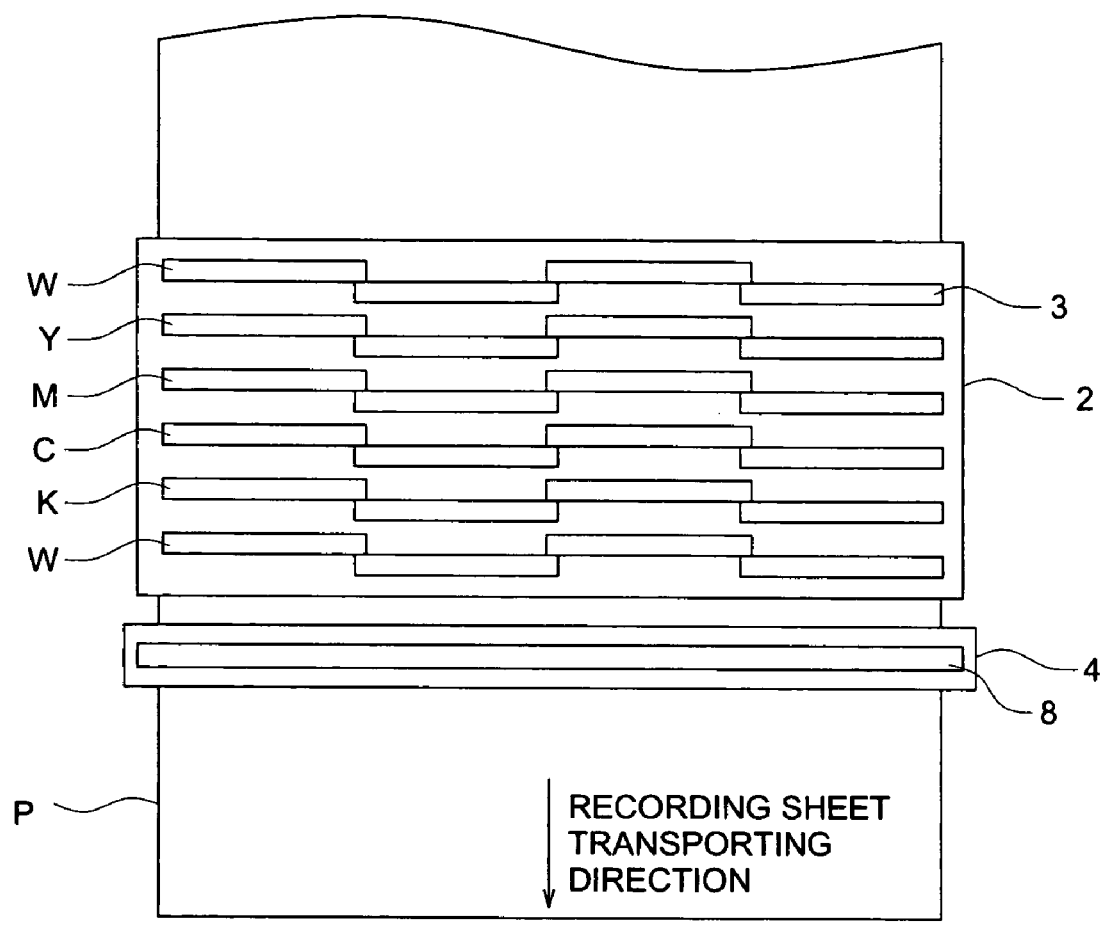
FIG. 2 shows a top view of another embodiment of the main section of the ink-jet recording apparatus of the invention.

FIG. 2 shows a top view of another embodiment of the main section of the ink-jet recording apparatus of the invention.

The ink-jet recording apparatus in FIG. 2 is called a line head type ink-jet recording apparatus. Recording heads 3 are provided in a head carriage 2 to cover the entire width of recording sheet P. The recording heads 3 each stores a different color ink, a white ink composition W, a yellow ink composition Y, a magenta ink composition M, a cyan ink composition C, a black ink composition K, and a white ink composition W.

Irradiation means 4 is provided just downstream of head carriage 2 to cover the entire width of recording sheet P and the entire printed surface. In FIG. 2, a metal halide lamp 8 is used as a light source in the irradiation means 4.

In the line head type recording apparatus, head carriage 2 and irradiation means 4 are fixed, and recording sheet P only is transported in the direction as shown in FIG. 2. Ink is ejected onto the recording sheet to be transported and then exposed through the irradiation means to form a cured image on the recording sheet.

EXAMPLES

The invention will be explained employing the following examples, however, the embodiments of the invention are not limited thereto.

<<Preparation of Ink Composition>>

Ink Composition

Ink having an ink composition as shown in Tables 1 through 6 was prepared. In the tables, the numerical values represent gram.

TABLE 1

Ink Composition Set 1 (Comparative)
(Each ink composition has a viscosity at 25° C. of from 28 to 32 mPa · s.)

| Components | Kinds of Ink | | | | | | | | |
|---|---|---|---|---|---|---|---|---|---|
| | Dk | Dc | Dm | Dy | W | Lk | Lc | Lm | Ly |
| Colorants | CI Pigment No. | | | | Titanium Oxide | CI Pigment No. | | | |
| | Black 7 | Blue 15:3 | Red 57:1 | Yellow 13 | | Black 7 | Blue 15:3 | Red 57:1 | Yellow 13 |
| | 4.0 | 4.0 | 5.0 | 5.0 | 5.0 | 1.0 | 1.0 | 1.3 | 1.3 |
| Celloxide 2021P | 36.0 | 28.0 | 27.0 | 27.0 | 37.0 | 31.0 | 31.0 | 30.8 | 20.8 |
| OXT-221 | 50.0 | 60.0 | 60.0 | 60.0 | 50.0 | 60.0 | 60.0 | 60.0 | 60.0 |
| OXT-101 | 10.0 | 10.0 | 10.0 | 10.0 | 10.0 | 10.0 | 10.0 | 10.0 | 10.0 |
| UVI 6992 | 5.0 | 3.0 | 3.0 | 3.0 | 3.0 | 3.0 | 3.0 | 3.0 | 3.0 |
| PB822 | 5.0 | 5.0 | 5.0 | 5.0 | 5.0 | 5.0 | 5.0 | 5.0 | 5.0 |

In Table 1 above, the details of the components in the ink composition are as follows:

Titanium Oxide: Anatase type, particle diameter: 0.2 μm

Celloxide 2021P: Alicyclic epoxy compound produced by DAICELL KAGAKU KOGYO CO., LTD., photopolymerizable compound OXT-221: Oxetane compound produced by TOA GOSEI CO., LTD., photopolymerizable compound OXT-101: Oxetane compound produced by TOA GOSEI CO., LTD., photopolymerizable compound UVI 6992: Photoinitiator produced by DOW CHEMICAL CO., LTD.

PB822: Dispersant produced by AJINOMOTO FINE TECHNO CO, LTD.

TABLE 2

Ink Composition Set 2 (Inventive)
(Each ink composition has a viscosity at 25° C. of from 30 to 34 mPa · s.)

| Components | Kinds of Ink | | | | | | | | |
|---|---|---|---|---|---|---|---|---|---|
| | Dk | Dc | Dm | Dy | W | Lk | Lc | Lm | Ly |
| Colorants | CI Pigment No. | | | | Titanium Oxide | CI Pigment No. | | | |
| | Black 7 | Blue 15:3 | Red 57:1 | Yellow 13 | | Black 7 | Blue 15:3 | Red 57:1 | Yellow 13 |
| | 4.0 | 4.0 | 5.0 | 5.0 | 5.0 | 1.0 | 1.0 | 1.3 | 1.3 |
| Celloxide 2021P | 32.5 | 28.0 | 27.0 | 27.0 | 31.5 | 31.0 | 31.0 | 30.7 | 30.7 |
| Compound E-2 | 10.0 | 5.0 | 5.0 | 5.0 | 10.0 | 5.0 | 5.0 | 5.0 | 5.0 |
| OXT-221 | 40.0 | 50.0 | 50.0 | 50.0 | 40.0 | 50.0 | 50.0 | 50.0 | 50.0 |
| MEGAFAC F178k | 0.02 | 0.02 | 0.02 | 0.02 | 0.02 | 0.02 | 0.02 | 0.02 | 0.02 |
| Propylene carbonate | 5.00 | 5.00 | 5.00 | 5.00 | 5.00 | 5.00 | 5.00 | 5.00 | 5.00 |
| DBA | 1.00 | 1.00 | 1.00 | 1.00 | 1.00 | 1.00 | 1.00 | 1.00 | 1.00 |
| Exemplified Compound S-8 | 2.5 | 2.0 | 2.0 | 2.0 | 2.5 | 2.0 | 2.0 | 2.0 | 2.0 |
| PB822 | 5.0 | 5.0 | 5.0 | 5.0 | 5.0 | 5.0 | 5.0 | 5.0 | 5.0 |

In Table 2 above, the details of the components in the ink composition are as follows:

Titanium Oxide: Anatase type, particle diameter: 0.2 μm

Celloxide 2021P: Alicyclic epoxy compound, produced by DAICELL KAGAKU KOGYO CO., LTD., photopolymerizable compound Compound E-2: Oxetane compound, photopolymerizable compound OXT-221: Oxetane compound, produced by TOA GOSEI CO., LTD., photopolymerizable compound MEGAFAC F178k: Nonionic fluorine-containing surfactant, produced by DAINIPPON INK KAGAKU KOGYO CO., LTD.

Propylene Carbonate: Reagent of KANTO KAGAKU CO., INC.

DBA: Anthracene derivative (Sensitizing agent), produced by KAWASAKI KASEI CO., LTD.

Exemplified Compound S-8: Photoinitiator

PB822: Dispersant, produced by AJINOMOTO FINE TECHNO CO, LTD.

N-Ethyl-diethanolamine: Basic compound

MEGAFAC F178k: Nonionic fluorine-containing surfactant produced by DAINIPPON INK KAGAKU KOGYO CO., LTD.

MEGAFAC F1405: Nonionic fluorine-containing surfactant produced by DAINIPPON INK KAGAKU KOGYO CO., LTD.

Propylene Carbonate: Reagent of KANTO KAGAKU CO., INC.

1,4,5,8,9-Pentamethyl-carbazole: Carbazole derivative (Sensitizing agent)

Exemplified Compound S-4: Photoinitiator

PB822: Dispersant produced by AJINOMOTO FINE TECHNO CO, LTD.

TABLE 3

Ink Composition Set 3 (Inventive)
(Each ink composition has a viscosity at 25° C. of from 25 to 28 mPa · s.)

| Components | Kinds of Ink | | | | | | | | |
|---|---|---|---|---|---|---|---|---|---|
| | Dk | Dc | Dm | Dy | W | Lk | Lc | Lm | Ly |
| Colorants | CI Pigment No. | | | | Titanium Oxide | CI Pigment No. | | | |
| | Black 7 | Blue 15:3 | Red 57:1 | Yellow 13 | | Black 7 | Blue 15:3 | Red 57:1 | Yellow 13 |
| | 4.0 | 4.0 | 5.0 | 5.0 | 5.0 | 1.0 | 1.0 | 1.3 | 1.3 |
| Vikoflex 9040 (ATOFINA) | 8.0 | 8.0 | 8.0 | 8.0 | 8.0 | 8.0 | 8.0 | 8.0 | 8.0 |
| EP-1 | 20.0 | 20.0 | 20.0 | 20.0 | 20.0 | 20.0 | 20.0 | 20.0 | 20.0 |
| Compound E-1 | 10.0 | 10.0 | 10.0 | 10.0 | 10.0 | 10.0 | 10.0 | 10.0 | 10.0 |
| OXT-221 | 33.9 | 34.4 | 33.4 | 33.4 | 32.9 | 37.4 | 37.4 | 37.1 | 37.1 |
| OXT-212 | 10.0 | 10.0 | 10.0 | 10.0 | 10.0 | 10.0 | 10.0 | 10.0 | 10.0 |
| N-Ethyl-diethanolamine | 0.10 | 0.10 | 0.10 | 0.10 | 0.10 | 0.10 | 0.10 | 0.10 | 0.10 |
| MEGAFAC F178k | 0.02 | 0.02 | 0.02 | 0.02 | 0.02 | 0.02 | 0.02 | 0.02 | 0.02 |
| MEGAFAC F1405 | 0.02 | 0.02 | 0.02 | 0.02 | 0.02 | 0.02 | 0.02 | 0.02 | 0.02 |
| Propylene Carbonate | 5.00 | 5.00 | 5.00 | 5.00 | 5.00 | 5.00 | 5.00 | 5.00 | 5.00 |
| 1,4,5,8,9-pentamethylcarbazole | 1.00 | 1.00 | 1.00 | 1.00 | 1.00 | 1.00 | 1.00 | 1.00 | 1.00 |
| Exemplified Compound S-4 | 3.0 | 2.5 | 2.5 | 2.5 | 3.0 | 2.5 | 2.5 | 2.5 | 2.5 |
| PB-822 | 5.0 | 5.0 | 5.0 | 5.0 | 5.0 | 5.0 | 5.0 | 5.0 | 5.0 |

In Table 3 above, the details of the components in the ink composition are as follows:

Titanium Oxide: Anatase type, particle diameter: 0.2 μm

Vikoflex 9040 (ATOFINA): Epoxidated linseed oil, photopolymerizable compound

EP-1: Alicyclic epoxy compound, photopolymerizable compound

Compound E-1: Oxetane compound, photopolymerizable compound

OXT-221: Oxetane compound produced by TOA GOSEI CO., LTD., photopolymerizable compound OXT-212: Oxetane compound produced by TOA GOSEI CO., LTD., photopolymerizable compound

TABLE 4

Ink Composition Set 4 (Comparative)
(Each ink composition has a viscosity at 25° C. of from 20 to 25 mPa · s.)

| Components | Kinds of Ink | | | | |
|---|---|---|---|---|---|
| | Dk | Dc | Dm | Dy | W |
| Colorants | CI Pigment No. | | | | Titanium Oxide |
| | Black 7 | Blue 15:3 | Red 57:1 | Yellow 13 | |
| | 4.0 | 4.0 | 5.0 | 5.0 | 5.0 |
| Celloxide 3000 | 33.5 | 33.5 | 22.5 | 22.5 | 32.5 |
| OXT-221 | 40.0 | 40.0 | 50.0 | 50.0 | 40.0 |
| OXT-211 | 15.0 | 15.0 | 15.0 | 15.0 | 15.0 |
| DTS 102 | 2.5 | 2.5 | 2.5 | 2.5 | 2.5 |
| PB822 | 5.0 | 5.0 | 5.0 | 5.0 | 5.0 |

In Table 4 above, the details of the components in the ink composition are as follows:

Titanium Oxide: Anatase type, particle diameter: 0.2 μm

Celloxide 3000: Alicyclic epoxy compound, produced by DAICELL KAGAKU KOGYO CO., LTD., photopolymerizable compound OXT-221: Oxetane compound produced by TOA GOSEI CO., LTD., photopolymerizable compound OXT-211: Oxetane compound produced by TOA GOSEI CO., LTD., photopolymerizable compound DTS102: Photoinitiator, produced by MIDOR1 KAGAKU CO., LTD.

PB822: Dispersant, produced by AJINOMOTO FINE TECHNO CO, LTD.

TABLE 5

Ink Composition Set 5 (Inventive)
(Each ink composition has a viscosity at 25° C. of from 28 to 32 mPa · s.)

| Components | Kinds of Ink | | | | |
|---|---|---|---|---|---|
| | Dk | Dc | Dm | Dy | W |
| Colorants | CI Pigment No. | | | | Titanium Oxide |
| | Black 7 | Blue 15:3 | Red 57:1 | Yellow 13 | |
| | 4.0 | 4.0 | 5.0 | 5.0 | 5.0 |
| EP-2 | 10.8 | 10.8 | 9.8 | 9.8 | 9.8 |
| Sansosizer E-4030 | 8.0 | 8.0 | 8.0 | 8.0 | 8.0 |
| Compound E-1 | 8.0 | 8.0 | 8.0 | 8.0 | 8.0 |
| OXT-211 | 15.0 | 15.0 | 15.0 | 15.0 | 15.0 |
| OXT-221 | 40.0 | 40.0 | 40.0 | 40.0 | 40.0 |
| Tributylamine | 0.20 | 0.20 | 0.20 | 0.20 | 0.20 |
| MEGAFAC F470 | 0.02 | 0.02 | 0.02 | 0.02 | 0.02 |
| Propylene Carbonate | 5.00 | 5.00 | 5.00 | 5.00 | 5.00 |
| N-Ethyl-3,6-bis(benzoyl)carbazole | 1.00 | 1.00 | 1.00 | 1.00 | 1.00 |
| Exemplified Compound S-1 | 3.0 | 3.0 | 3.0 | 3.0 | 3.0 |
| PB822 | 5.0 | 5.0 | 5.0 | 5.0 | 5.0 |

In Table 5 above, the details of the components in the ink composition are as follows:

Titanium Oxide: Anatase type, particle diameter: 0.2 μm

EP-2: Alicyclic epoxy compound, photopolymerizable compound

Sansosizer E-4030: Epoxidated fatty acid isobutyl ester, photopolymerizable compound Compound E-1: Oxetane compound, photopolymerizable compound OXT-211: Oxetane compound produced by TOA GOSEI CO., LTD., photopolymerizable compound OXT-221: Oxetane compound produced by TOA GOSEI CO., LTD., photopolymerizable compound N-Tributylamine: Basic compound MEGAFAC F470: Nonionic fluorine-containing surfactant produced by DAINIPPON INK KAGAKU KOGYO CO., LTD.

MEGAFAC Propylene Carbonate: Reagent of KANTO KAGAKU CO., INC.

N-Ethyl-3,6-bis(benzoyl)-carbazole: Carbazole derivative (Sensitizing agent)

Exemplified Compound S-1: Photoinitiator

PB822: Dispersant produced by AJINOMOTO FINE TECHNO CO, LTD.

TABLE 6

Ink Composition Set 6 (Inventive)
(Each ink composition has a viscosity at 25° C. of from 31 to 34 mPa · s.)

| Components | Kinds of Ink | | | | |
|---|---|---|---|---|---|
| | Dk | Dc | Dm | Dy | W |
| Colorants | CI Pigment No. | | | | Titanium Oxide |
| | Black 7 | Blue 15:3 | Red 57:1 | Yellow 13 | |
| | 4.0 | 4.0 | 5.0 | 5.0 | 5.0 |
| OXT-221 | 28.0 | 28.0 | 28.0 | 28.0 | 28.0 |
| RSDX | 10.0 | 10.0 | 10.0 | 10.0 | 10.0 |
| EP-3 | 28.0 | 28.0 | 28.0 | 28.0 | 28.0 |
| Vikoflex 9010 (ATOFINA) | 8.9 | 8.9 | 7.9 | 7.9 | 7.9 |
| Exemplified Compound E-2 | 6 | 6 | 6 | 6 | 6 |
| Tributylamine | 0.1 | 0.1 | 0.1 | 0.1 | 0.1 |
| MEGAFAC F475 | 0.02 | 0.02 | 0.02 | 0.02 | 0.02 |
| MEGAFAC EXP. TF907 | 0.02 | 0.02 | 0.02 | 0.02 | 0.02 |
| γ-Butyrolactone | 5.00 | 5.00 | 5.00 | 5.00 | 5.00 |
| 9,9'-Diethyl-3,3'-dicarbazole | 1.00 | 1.00 | 1.00 | 1.00 | 1.00 |
| Exemplified Compound S-6 | 4.0 | 4.0 | 4.0 | 4.0 | 4.0 |
| PB822 | 5.0 | 5.0 | 5.0 | 5.0 | 5.0 |

In Table 6 above, the details of the components in the ink composition are as follows:

Titanium Oxide: Anatase type, particle diameter: 0.2 μm

OXT-221: Oxetane compound produced by TOA GOSEI CO., LTD., photopolymerizable compound RSDX: Oxetane compound produced by TOA GOSEI CO., LTD., photopolymerizable compound EP-3: Alicyclic epoxy compound, photopolymerizable compound Vikoflex 9040 (ATOFINA): Epoxidated linseed oil, photopolymerizable compound Exemplified Compound E-2: Oxetane compound, photopolymerizable compound N-Tributyl-amine: Basic compound MEGAFAC F475: Nonionic fluorine-containing surfactant produced by DAINIPPON INK KAGAKU KOGYO CO., LTD.

MEGAFAC EXP. TF907: Nonionic fluorine-containing surfactant produced by DAINIPPON INK KAGAKU KOGYO CO., LTD.

γ-Butyrolactone: Reagent of KANTO KAGAKU CO., INC.

9,9'-Diethyl-3,3'-dicarbazole: Carbazole derivative (Sensitizing zgent)

Exemplified Compound S-6: Photoinitiator

PB822: Dispersant produced by AJINOMOTO FINE TECHNO CO, LTD.

Epoxy EP-1

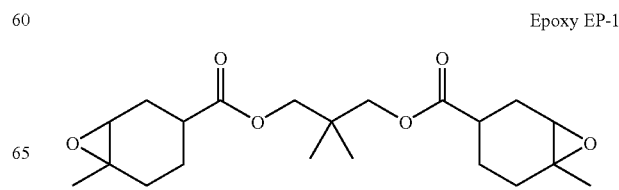

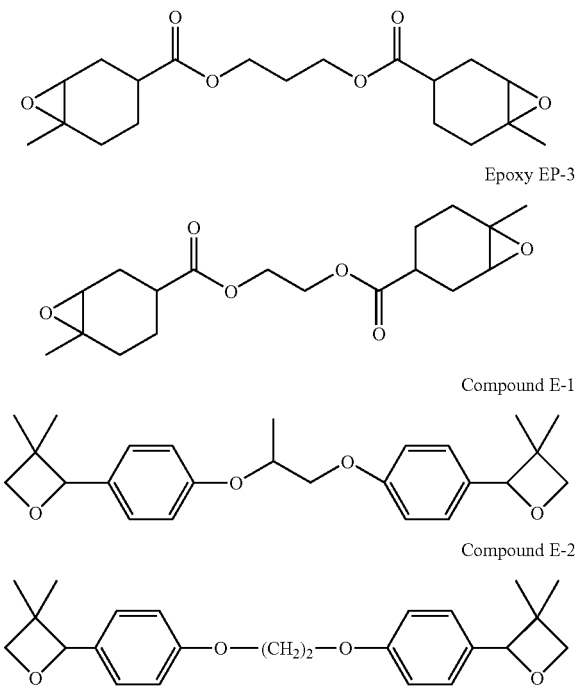

The components as shown in Tables 1 and 4 other than the colorant and photoinitiator, were mixed and stirred for 1 hour while heating to 65° C. on a hot plate to obtain a mixture solution.

Subsequently, the colorant as shown in Tables 1 and 4 was added in an amount as shown Tables 1 and 4 to the resulting mixture solution, mixed with 200 g of zirconia beads with a diameter of 1 mm, placed in a plastic vessel, and tightly sealed. The resulting mixture was dispersed for 2 hours in a paint shaker, and the zirconia beads were removed to obtain a dispersion. Thereafter, the resulting dispersion was added with the photoinitiator as shown in Tables 1 and 4, and filtered with a membrane filter with 0.8 μm pores. Thus, ink composition sets 1 and 4 (each comparative) was obtained.

The components as shown in Tables 2, 3 and 5 other than the colorant, photoinitiator, sensitizing agent, and propylene carbonate were mixed and stirred for 1 hour while heating to 65° C. on a hot plate to obtain a mixture solution.

Subsequently, the colorant as shown in Tables 2, 3 and 5 were added in an amount as shown in Tables 2, 3 and 5 to the resulting mixture solution, mixed with 200 g of zirconia beads with a diameter of 1 mm, placed in a plastic vessel, and tightly sealed. The resulting mixture was dispersed for 2 hours in a paint shaker, and the zirconia beads were removed to obtain a dispersion. Thereafter, the resulting dispersion was added with the photoinitiator and sensitizing agent dissolved in propylene carbonate as shown in Tables 2, 3 and 5, and filtered with a membrane filter with 0.8 μm pores. Thus, ink composition sets 2, 3 and 5 (Inventive) were obtained.

The components as shown in Table 6 other than the colorant, photoinitiator, sensitizing agent, and γ-butyrolactone were mixed and stirred for 1 hour while heating to 65° C. on a hot plate to obtain a mixture solution.

Subsequently, the colorant as shown in Table 6 was added in an amount as shown in Table 6 to the resulting mixture solution, mixed with 200 g of zirconia beads with a diameter of 1 mm, placed in a plastic vessel, and tightly sealed. The resulting mixture was dispersed for 2 hours in a paint shaker, and the zirconia beads were removed to obtain a dispersion. Thereafter, the resulting dispersion was added with the photoinitiator and sensitizing agent dissolved in γ-butyrolactone as shown in Table 6, and filtered with a membrane filter with 0.8 μm pores. Thus, ink composition set 6 (Inventive) was obtained.

In Tables 1 through 6 above, "Dk", "Dc" "Dm" "Dy", "W", "Lk", "Lc", "Lm", and "Ly" are as follows:
Dk: Deep black ink composition
Dc: Deep cyan ink composition
Dm: Deep magenta ink composition
Dy: Deep yellow ink composition
W: White ink composition
Lk: Light black ink composition
Lc: Light cyan ink composition
Lm: Light magenta ink composition
Ly: Light yellow ink composition <<Ink-jet Ink Image Formation Method>>

Ink composition set 1, 2 or 3 prepared above was mounted on an ink jet recording apparatus as shown in FIG. 1 equipped with a piezo-type ink jet nozzle, and image recording was performed continuously on each of 600 mm wide and 1000 m long recording sheets having a surface energy as shown in Table 7. An ink supply system is comprised of an ink tank, a supply pipe, a pre-chamber ink tank directly before a head, a piping attached with a filter, and a piezo-head, and the portion from the pre-chamber tank to the head was heated at 50° C. The piezo-head was driven so as to eject ink droplets of from 2 to 15 μl at a resolution of 720 dpi×720 dpi. Thus, each ink was continuously ejected onto the recording sheet, and, 0.1 seconds after ink was ejected and arrived at the recording sheet, exposure was carried out at an exposure energy on the recording sheet surface of 400 mW/cm$^2$ employing the light sources on both sides of the carriage to form a cured ink image. A high pressure mercury lamp Vzero 085, produced by INTEGRATION TECHNOLOGY CO., was employed as the light source. Thus, samples 1 through 12 with a cured ink image were obtained.

The thickness of the resulting ink image layer was measured to be in a range of from 2.3 to 13 μm. Herein, dpi represents a dot number per 2.54 cm.

The above ink-jet ink image formation was carried out under three recording circumstances, (1) at 10° C. and 20% RH, (2) at 25° C. and 50% RH, and (3) at 32° C. and 80% RH, in the image formation method described above.

Next, the same procedures as above were conducted, except that ink composition set 4, 5, or 6 prepared above was mounted on an ink jet recording apparatus employing a line head recording process as shown in FIG. 2, each ink was continuously ejected onto the recording sheet, and, 0.1 seconds after ink was ejected and arrived at the recording sheet, exposure was carried out at an exposure energy on the recording sheet surface of 360 mW/cm$^2$, employing a 120 W/cm metal halide lamp (MAL 400NL, produced by NIPPON DENCHI CO., LTD.) at an output power of 3 kw. Thus, samples 13 through 24 with a cured ink image were obtained.

Table 7 shows conditions under which samples 1 through 13 were obtained.

In Table 7, abbreviation of each of the recording sheets is as follows:
OPP: Oriented polypropyrene (YUPO)
PET: Polyethylene terephthalate
PVC: Polyvinyl chloride

TABLE 7

| Sample No. | Ink Composition used | Recording Sheet used | Surface Energy (μN/cm) of Recording Sheet | Exposure Energy on the Recording Sheet (mW/cm²) | Remarks |
|---|---|---|---|---|---|
| 1 | 1 | OPP (YUPO) | 380 | 400 | Comp. |
| 2 | 1 | PET | 530 | 400 | Comp. |
| 3 | 1 | PVC | 450 | 400 | Comp. |
| 4 | 1 | Art Paper | Absorptive sheet | 400 | Comp. |
| 5 | 2 | OPP (YUPO) | 380 | 400 | Inv. |
| 6 | 2 | PET | 530 | 400 | Inv. |
| 7 | 2 | PVC | 450 | 400 | Inv. |
| 8 | 2 | Art Paper | Absorptive sheet | 400 | Inv. |
| 9 | 3 | OPP (YUPO) | 380 | 400 | Inv. |
| 10 | 3 | PET | 530 | 400 | Inv. |
| 11 | 3 | PVC | 450 | 400 | Inv. |
| 12 | 3 | Art Paper | Absorptive sheet | 400 | Inv. |
| 13 | 4 | OPP (YUPO) | 380 | 360 | Comp. |
| 14 | 4 | PET | 530 | 360 | Comp. |
| 15 | 4 | PVC | 450 | 360 | Comp. |
| 16 | 4 | Art Paper | Absorptive sheet | 360 | Comp. |
| 17 | 5 | OPP (YUPO) | 380 | 360 | Inv. |
| 18 | 5 | PET | 530 | 360 | Inv. |
| 19 | 5 | PVC | 450 | 360 | Inv. |
| 20 | 5 | Art Paper | Absorptive sheet | 360 | Inv. |
| 21 | 6 | OPP (YUPO) | 380 | 360 | Inv. |
| 22 | 6 | PET | 530 | 360 | Inv. |
| 23 | 6 | PVC | 450 | 360 | Inv. |
| 24 | 6 | Art Paper | Absorptive sheet | 360 | Inv. |

Comp.: Comparative,
Inv.: Inventive

<Evaluation of Ink Jet Recording Image>

The following evaluations were carried out with respect to each image recorded according to the above-described image forming method.

(Character Quality)

6-point MS Minchyo font characters were recorded at an aimed density employing inks Y, M, C and K, and the resulting characters were evaluated for roughness through a magnifying glass according to the following criteria.

A: No roughness was observed.

B: Slight roughness was observed.

C: Roughness was observed, however, the resulting characters were legible, which was the lowest usable level.

D: Significant roughness was observed, and the resulting characters were scratchy, which could not be put into practical use.

(Color Contamination (or Bleeding-out))

One dot of each of inks Y, M, C and K was recorded at 720 dpi to be adjacent to each other, and the resulting two adjacent dots were evaluated for color contamination (or bleeding-out) through a magnifying glass according to the following criteria.

A: The shapes of the two adjacent dots kept a true circle, and no bleeding-out was observed.

B: The shapes of the two adjacent dots kept a nearly true circle, and little bleeding-out was observed.

C: The two adjacent dots showed a little bleeding-out, and the dot shapes were slightly deformed, however, which was the lowest usable level.

D: The two adjacent dots showed bleeding-out and were contaminated with each, which could not be put into practical use.

The results are shown in Table 8.

TABLE 8

| | Recording Circumstances | | | | | | |
|---|---|---|---|---|---|---|---|
| | 10° C., 20% RH | | 25° C., 50% RH | | 32° C., 80% RH | | |
| Sample No. | Character Quality | Color Contamination | Character Quality | Color Contamination | Character Quality | Color Contamination | Remarks |
| 1 | C | C | D | C | D | D | Comp. |
| 2 | B | D | D | D | D | D | Comp. |
| 3 | B | C | D | D | D | D | Comp. |
| 4 | B | C | C | D | C | D | Comp. |
| 5 | B | A | B | A | B | B | Inv. |
| 6 | A | B | A | B | B | B | Inv. |
| 7 | A | A | A | B | B | B | Inv. |
| 8 | A | A | A | B | B | B | Inv. |
| 9 | B | A | B | A | B | B | Inv. |
| 10 | A | B | A | B | A | B | Inv. |
| 11 | A | A | A | B | A | B | Inv. |
| 12 | A | A | A | A | A | A | Inv. |
| 13 | B | B | D | D | D | D | Comp. |
| 14 | B | B | C | D | D | D | Comp. |
| 15 | B | B | C | D | D | D | Comp. |
| 16 | B | B | C | D | C | D | Comp. |
| 17 | B | A | B | B | B | B | Inv. |
| 18 | B | B | B | B | B | B | Inv. |
| 19 | B | B | B | B | B | B | Inv. |
| 20 | A | A | A | A | A | A | Inv. |
| 21 | B | A | B | A | B | A | Inv. |
| 22 | A | B | A | B | A | B | Inv. |
| 23 | B | A | B | B | B | B | Inv. |
| 24 | A | A | A | A | A | A | Inv. |

Comp.: Comparative,
Inv.: Invention

As is apparent from Table 8 above, the inventive ink sets form an image with high precision on various kinds of recording sheets, regardless of ambient atmosphere conditions.

Effects of the Invention

The present invention can provide an actinic ray curable ink-jet ink composition (hereinafter also referred to as ink composition), which stably forms an image with high precision, and a character with excellent quality, without color contamination under various recording circumstances, and an image formation method and an ink jet recording apparatus each employing the actinic ray curable ink-jet ink composition.

What is claimed is:

1. An actinic ray curable ink-jet ink composition containing a photopolymerizable compound, a sulfonium salt (compound A) as a photoinitiator, which does not release benzene on actinic ray exposure, a basic compound, and a compound (compound B) as a sensitizing agent selected from the group consisting of (i) a polycyclic aromatic compound having a hydroxyl group, a substituted or unsubstituted aralkyloxy group or a substituted or unsubstituted alkoxy group, (ii) a carbazole derivative, and (iii) a thioxanthone derivative, wherein the sulfonium salt (the compound A) is a sulfonium salt represented by the following formula (3), (4), (5), or (6):

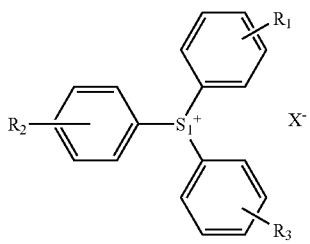

Formula (3)

wherein $R_1$ through $R_3$ independently represent an alkyl group, an alkoxy group, a carbonyl group, a phenylthio group, a halogen atom, a nitro group, or a hydroxy group, provided that at least one of $R_1$ through $R_3$ is an alkoxy group; and $X^-$ represents an anion;

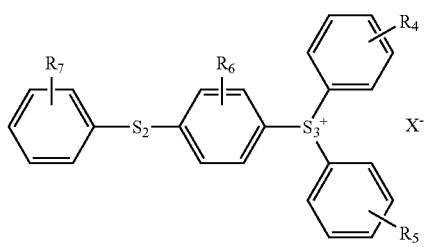

Formula (4)

wherein $R_4$ through $R_7$ independently represent an alkyl group, an alkoxy group, a carbonyl group, a phenylthio group, a halogen atom, a nitro group, or a hydroxy group, provided that at least one of $R_4$ through $R_7$ is an alkoxy group; and $X^-$ represents an anion;

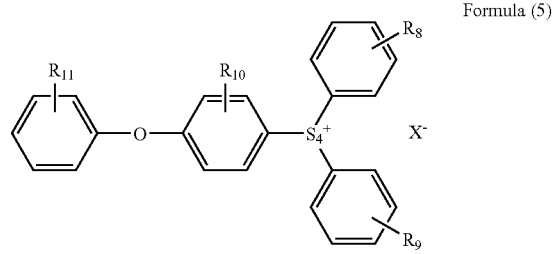

Formula (5)

wherein $R_8$ through $R_{11}$ independently represent an alkyl group, an alkoxy group, a carbonyl group, a phenylthio group, a halogen atom, a nitro group, or a hydroxy group, provided that at least one of $R_8$ through $R_{11}$ is an alkoxy group; and $X^-$ represents an anion;

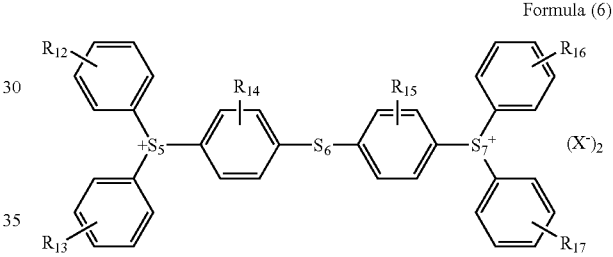

Formula (6)

wherein $R_{12}$ through $R_{17}$ independently represent an alkyl group, an alkoxy group, a carbonyl group, a phenylthio group, a halogen atom, a nitro group, or a hydroxy group, provided that at least one of $R_{12}$ through $R_{17}$ is an alkoxy group; and $X^-$ represents an anion.

2. The actinic ray curable ink-jet ink composition of claim 1, wherein the compound B is a carbazole derivative represented by the following formula (1) or (2):

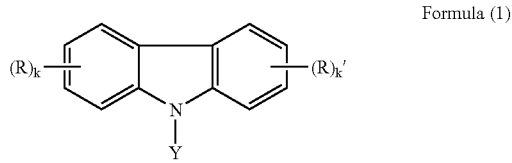

Formula (1)

wherein R represents a fluorine atom, a chlorine atom, a bromine atom, a hydroxyl group, a mercapto group, a nitro group or a monovalent organic group having a carbon atom number of from 1 to 19; k and k' independently represent an integer of from 0 to 4, provided that when k and k' are 2 or more, plural Rs may be the same or different; and Y represents a monovalent organic group having a carbon atom number of from 1 to 18.

Formula (2)

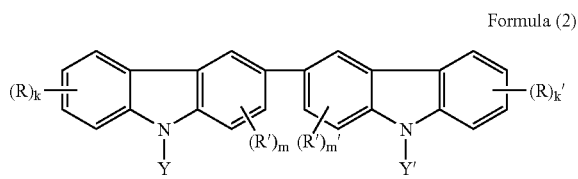

wherein R and R' independently represent a fluorine atom, a chlorine atom, a bromine atom, a hydroxyl group, a mercapto group, a nitro group or a monovalent organic group having a carbon atom number of from 1 to 19; k and k' independently represent an integer of from 0 to 4; m and m' independently represent an integer of from 0 to 2, provided that when k and k' are 2 or more, plural R's may be the same or different, and when m and m' are 2 or more, plural R's may be the same or different; and Y and Y' independently represent a monovalent organic group having a carbon atom number of from 1 to 18.

3. The actinic ray curable ink-jet ink composition of claim 1, further containing a nonionic surfactant.

4. The actinic ray curable ink-jet ink composition of claim 1, wherein the photopolymerizable compound is an oxetane ring-containing compound.

5. The actinic ray curable ink-jet ink composition of claim 1, wherein the photopolymerizable compound is an oxirane ring-containing compound.

6. The actinic ray curable ink-jet ink composition of claim 1, wherein the photopolymerizable compound is a mixture of 30 to 95% by weight of an oxetane ring-containing compound, 5 to 70% by weight of an oxirane ring-containing compound, and 0 to 40% by weight of a vinyl ether compound.

7. The actinic ray curable ink-jet ink composition of claim 1, further containing colorant such as a dye or pigment.

8. The actinic ray curable ink-jet ink composition of claim 7, wherein the colorant is pigment.

9. The actinic ray curable ink-jet ink composition of claim 1, wherein the composition has a viscosity at 25° C. of from 7 to 50 mPa·s.

10. The actinic ray curable ink-jet ink composition of claim 1, wherein the basic compound is selected from the group consisting of a basic alkali metal compound, basic alkali earth metal compound and an amine.

11. The actinic ray curable ink-jet ink composition of claim 10, wherein the basic compound is selected from the group consisting of lithium hydroxide, sodium hydroxide, potassium hydroxide, lithium carbonate, sodium carbonate, potassium carbonate, sodium methoxide, potassium methoxide, potassium ethoxide, magnesium hydroxide, calcium hydroxide, magnesium carbonate, calcium carbonate, magnesium methoxide, quinoline, quinolizine, octylamine, naphthylamine, xylenediamine, dibenzylamine, diphenylamine, dibutylamine, trioctylamine, tetramethylethylenediamine, teramethyl-1,6-hexamethylenediamine, hexamethylenetetramine, and triethanolamine.

12. The actinic ray curable ink-jet ink composition of claim 1, wherein the content of the basic compound in the actinic ray curable ink-jet ink composition is from 10 to 1,000 ppm by weight, based on the total weight of the photopolymerizable compound.

13. An actinic ray curable ink-jet ink composition containing a photopolymerizable compound, a sulfonium salt (compound A) as a photoinitiator, which does not release benzene on actinic ray exposure, a basic compound, and a compound (compound B) as a sensitizing agent selected from the group consisting of (i) a polycyclic aromatic compound having a hydroxyl group, a substituted or unsubstituted aralkyloxy group or a substituted or unsubstituted alkoxy group, (ii) a carbazole derivative, and (iii) a thioxanthone derivative, wherein the sulfonium salt (the compound A) is a sulfonium salt represented by the following formula (4), (5), or (6):

Formula (4)

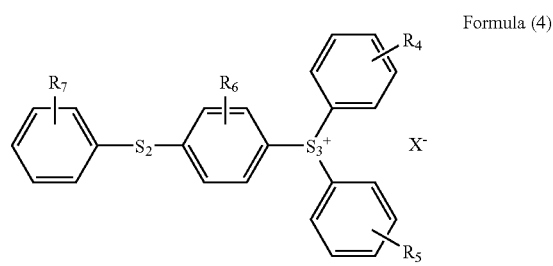

wherein $R_4$ through $R_7$ independently represent an alkyl group, an alkoxy group, a carbonyl group, a phenylthio group, a halogen atom, a nitro group, or a hydroxy group, provided that at least one of $R_4$ through $R_7$ is an alkoxy group; and $X^-$ represents an anion, Formula (5)

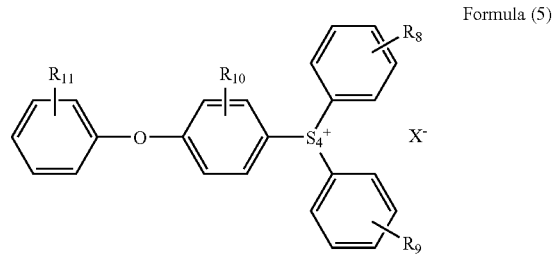

wherein $R_8$ through $R_{11}$ independently represent an alkyl group, an alkoxy group, a carbonyl group, a phenylthio group, a halogen atom, a nitro group, or a hydroxy group, provided that at least one of $R_8$ through $R_{11}$ is an alkoxy group; and $X^-$ represents an anion, Formula (6)

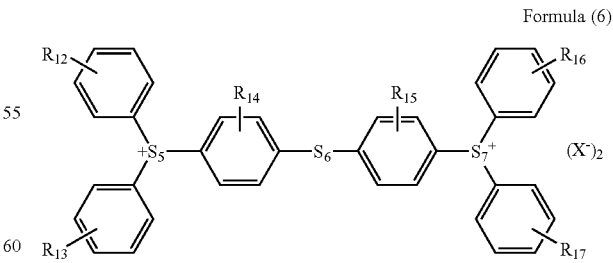

wherein $R_{12}$ through $R_{17}$ independently represent an alkyl group, an alkoxy group, a carbonyl group, a phenylthio group, a halogen atom, a nitro group, or a hydroxy group, provided that at least one of $R_{12}$ through $R_{17}$ is an alkoxy group; and $X^-$ represents an anion.

14. A process of forming an image on a recording sheet employing an ink-jet recording head, the process comprising the steps of:
- ejecting the actinic ray curable ink-jet ink composition of claim 1 from the ink-jet recording head onto the recording sheet to form an image on the recording sheet; and
- exposing the image to actinic rays between 0.001 seconds and 2.0 seconds after the ejected ink composition has arrived at the recording sheet, whereby a cured ink image was formed.

15. The process of claim 14, wherein the cured image has a thickness of from 2 to 20 μm.

16. The process of claim 14, wherein the ink-jet recording head is a line head recording head.

17. The process of claim 14 further comprising the step of heating the actinic ray curable ink-jet ink composition and the ink-jet recording head to a temperature between 35 to 100° C.

18. A process of forming an image on a recording sheet employing an ink-jet recording head, the process comprising the steps of:
- ejecting the actinic ray curable ink-jet ink composition of claim 1 from the ink-jet recording head onto the recording sheet to form an image on the recording sheet, the ink composition being ejected as ink droplets from each of nozzles of the ink-jet recording head, wherein the ink droplets have a volume of from 2 to 15 pl.

19. The process of claim 18, wherein the cured image has a thickness of from 2 to 20 μm.

20. The process of claim 18, wherein the ink-jet recording head is a line head recording head.

* * * * *